US011630718B2

(12) United States Patent
Malboubi et al.

(10) Patent No.: US 11,630,718 B2
(45) Date of Patent: Apr. 18, 2023

(54) USING USER EQUIPMENT DATA CLUSTERS AND SPATIAL TEMPORAL GRAPHS OF ABNORMALITIES FOR ROOT CAUSE ANALYSIS

(71) Applicant: AT&T Intellectual Property I, L.P., Atlanta, GA (US)

(72) Inventors: Mehdi Malboubi, San Ramon, CA (US); Hyun Ok Lee, San Ramon, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 229 days.

(21) Appl. No.: 15/931,963

(22) Filed: May 14, 2020

(65) Prior Publication Data

US 2021/0357281 A1 Nov. 18, 2021

(51) Int. Cl.
| | | |
|---|---|---|
| *G06F 11/07* | (2006.01) | |
| *G06F 16/28* | (2019.01) | |
| *H04W 8/24* | (2009.01) | |
| *G06F 16/901* | (2019.01) | |
| *G06F 16/23* | (2019.01) | |

(52) U.S. Cl.
CPC ........ *G06F 11/079* (2013.01); *G06F 11/0709* (2013.01); *G06F 11/0751* (2013.01); *G06F 16/2379* (2019.01); *G06F 16/285* (2019.01); *G06F 16/9024* (2019.01); *H04W 8/24* (2013.01)

(58) Field of Classification Search
CPC ............... G06F 16/2379; G06F 16/285; G06F 16/9024; G06F 11/079; G06F 11/0709; G06F 11/0751; H04W 8/24
See application file for complete search history.

(56) References Cited

U.S. PATENT DOCUMENTS

| | | | | |
|---|---|---|---|---|
| 9,842,017 | B1 * | 12/2017 | Zhang | .................... G06F 11/079 |
| 10,742,482 | B2 * | 8/2020 | Tellado | ................. H04L 41/142 |
| 2006/0048010 | A1 * | 3/2006 | Tai | ....................... G06F 11/0706 |
| | | | | 714/E11.026 |
| 2011/0087924 | A1 * | 4/2011 | Kandula | ............. G06F 11/0709 |
| | | | | 714/E11.029 |
| 2012/0157795 | A1 * | 6/2012 | Chiu | ....................... H04L 67/52 |
| | | | | 370/259 |
| 2016/0342903 | A1 * | 11/2016 | Shumpert | ............. G06F 11/008 |

(Continued)

*Primary Examiner* — Robert W Beausoliel, Jr.
*Assistant Examiner* — Susan F Rayyan
(74) *Attorney, Agent, or Firm* — Hartman & Citrin LLC

(57) ABSTRACT

Concepts and technologies are disclosed herein for using user equipment data clusters and spatial temporal graphs of abnormalities for root cause analysis. User equipment data can be obtained from a cellular network. A filter having a threshold can be applied to the user equipment data to obtain a records. A determination is made whether the threshold is to be adaptively adjusted. If a determination is made that the threshold is not to be adjusted, the records can be added to a record set. The records in the subset of records can be correlated based on a key to obtain a filtered and correlated version of the record set, a spatial temporal graph of abnormalities associated with the cellular network can be generated based on the filtered and correlated version of the record set, and a root cause of a failure can be determined based on the spatial temporal graph of abnormalities.

20 Claims, 10 Drawing Sheets

(56) References Cited

U.S. PATENT DOCUMENTS

| | | | |
|---|---|---|---|
| 2018/0024901 A1* | 1/2018 | Tankersley | G06Q 10/06393 |
| | | | 707/694 |
| 2018/0165142 A1* | 6/2018 | Harutyunyan | G06F 11/079 |
| 2019/0042340 A1* | 2/2019 | Takaeda | G06F 11/079 |
| 2019/0227860 A1* | 7/2019 | Gefen | G06F 16/9024 |
| 2019/0268215 A1* | 8/2019 | Tellado | H04L 41/0672 |
| 2019/0334759 A1* | 10/2019 | Ray | H04L 41/142 |
| 2020/0250193 A1* | 8/2020 | Pham | G06F 16/283 |
| 2021/0182699 A1* | 6/2021 | Koyyalummal | G06N 5/04 |
| 2021/0377706 A1* | 12/2021 | Lekutai | H04W 4/06 |
| 2022/0083033 A1* | 3/2022 | Ando | G06Q 50/04 |

* cited by examiner

FIG. 5

USING USER EQUIPMENT DATA CLUSTERS AND SPATIAL TEMPORAL GRAPHS OF ABNORMALITIES FOR ROOT CAUSE ANALYSIS

BACKGROUND

In some current and evolving networks, a large number of user equipment ("UE's") may exist. These networks may generate large amounts of data and control and measurement traffic. Because of the large amounts of devices and data being generated on some networks, it may be challenging to identify equipment (e.g., UE's, cells, or the like) that are experiencing malfunctions and/or to remedy such malfunctions.

Some current approaches to addressing these or other concerns may rely on event reporting and/or using signatures, which can have high false alarm rates. In some other approaches, huge amounts of data may be collected and analyzed, which can require large amounts of data storage and/or processing resources.

SUMMARY

The present disclosure is directed to using user equipment data clusters and spatial temporal graphs of abnormalities for root cause analysis. The user equipment data contains a variety of information including data usage, and control and measurement information. Concepts and technologies disclosed herein can provide a systematic hierarchical approach to correlating multiple events and/or data-sources to reduce a size of data that needs to be processed and/or analyzed to identify failures and/or to detect anomalous equipment (e.g., UE's) with high confidence and a low false-alarm rate. In addition, a spatial temporal graph of abnormalities can be constructed to provide valuable insight on the behavior of the network to identify the source of abnormalities and to recommend resolutions. In some embodiments, spatial temporal graph of abnormalities (e.g., network abnormalities) can be stored in a graph database (e.g. a Neo4j database), which may be an efficient method to apply graph analytics and/or to perform graph data queries.

A computing device can obtain an instance of user equipment data. The user equipment data can be obtained, in some embodiments, from a user equipment data source (for example a data source operating on a cellular network). The user equipment data can include a number of records. In some embodiments, each record can be associated with an event associated with a device such as, for example, a network device, a user equipment, or the like. In some instances, the events may contain information about failures or anomalies. The computing device can be configured to determine one or more filters to apply to the user equipment data to reduce the amount of data (e.g., a number of records) to be analyzed by the computing device.

The computing device can apply a first filter to the user equipment data and obtain multiple records that can satisfy one or more thresholds and/or parameters associated with the applied filter. After obtaining the multiple records, the computing device can determine if any thresholds associated with the filter are to be adaptively adjusted. The computing device can make this determination based on a number of records obtained by applying the filter (e.g., if the number of records obtained fails to meet a minimum threshold for the number of records, the threshold for the filter can be adjusted to capture more records in the user equipment data, while if the number of records obtained exceeds a maximum threshold for the number of records, the threshold of the filter can be adjusted to capture fewer records in the user equipment data).

If the threshold associated with the filter is to be adjusted, the computing device can apply a clustering algorithm to the records obtained by applying the filter to the user equipment data. In some instances, a k-means algorithm can be applied to the records obtained by applying the filter. In some embodiments, k is set as equal to two, and as such, the computing device can generate two data clusters. A new threshold can be determined for the filter based on the data clusters. In some embodiments, the computing device can determine a centroid for each of the two data clusters, and a value based on the two centroids (e.g., a mean, an average, or a function of the two centroid values) can be used as the new threshold for the filter. The filter (with one or more modified thresholds) can be applied to the records and/or to the user equipment data to adjust the number of records as noted above, and the records obtained by applying the modified filter can be used to create a record set.

The computing device can determine if additional filters are to be applied to the user equipment data and/or to the record set, and if so, the application of filters (and adjustment of thresholds) can be iterated until all of the identified filters have been applied and a filtered record set has been obtained (the filtered record set corresponds to the set of records obtained after applying all identified filters to the user equipment data and/or the resulting record sets). The computing device can identify one or more keys (or a key set) to apply to the filtered record set to correlate the various records included in the filtered record set, the records in the filtered record set can be correlated to one another, and a filtered and correlated record set can be output by the computing device.

The computing device can generate, based on the filtered and correlated record set, a spatial temporal graph of abnormalities. The spatial temporal graph of abnormalities can be used in association with the filtered and correlated record set to identify root causes for failures in a network (associated with the user equipment data obtained by the computing device). Once the root causes are determined by the computing device, the computing device can identify solutions for the root causes and can output commands and/or other information that can be used to resolve the root causes. These and other aspects of the concepts and technologies disclosed herein will be illustrated and described in more detail herein.

According to one aspect of the concepts and technologies disclosed herein, a system is disclosed. The system can include a processor and a memory. The memory can store computer-executable instructions that, when executed by the processor, cause the processor to perform operations. The operations can include obtaining user equipment data from a cellular network; applying a filter having a threshold to the user equipment data (the user equipment data can contain information about multiple UE) to obtain a subset of records from the user equipment data; determining if the threshold is to be adjusted based on a number of the records included in the subset of records; in response to a determination that the threshold is not to be adjusted, adding the records of the subset of records to a record set; correlating the records of the subset of records based on a key to obtain a filtered and correlated version of the record set; generating, based on the filtered and correlated version of the record set, a spatial temporal graph of abnormalities associated with the cellular network; and determining, based on the spatial temporal graph of abnormalities, a root cause of a failure associated with the cellular network.

In some embodiments, the operations further can include in response to a determination that the threshold is to be adjusted, generating two or more data clusters by applying a clustering algorithm to the record set; determining a centroid for each of the two or more data clusters; and adjusting the threshold based on the centroid for each of the two or more data clusters. In some embodiments, the operations further can include in response to a determination that the threshold is to be adjusted, applying a k-means clustering algorithm to the record set to generate two data clusters; and determining a first centroid for a first of the two data clusters and a second centroid for a second of the two data clusters. The first centroid can be associated with a first value and the second centroid can be associated with a second value. The operations also can include adjusting the threshold based on a function of the first value and the second value.

In some embodiments, the function of the first value and the second value can include an average of the first value and the second value. In some embodiments, the operations further can include identifying a solution for the root cause of the failure; and outputting the solution for implementation on the cellular network. In some embodiments, applying the filter can include applying a first filter to the user equipment data to obtain a first subset of records; applying a second filter to the record set to obtain a second subset of records; and replacing the first subset of records in the record set with the second subset of records. In some embodiments, applying the filter can include applying a first filter to the user equipment data to obtain a first subset of records; applying a second filter to the record set and to the user equipment data to obtain a second subset of records; and replacing the first subset of records in the record set with the second subset of records.

According to another aspect of the concepts and technologies disclosed herein, a method is disclosed. The method can include obtaining, at a computing device that can include a processor, user equipment data from a cellular network; applying, by the processor, a filter having a threshold to the user equipment data to obtain a subset of records from the user equipment data; determining, by the processor, if the threshold is to be adjusted based on a number of the records included in the subset of records; in response to a determination that the threshold is not to be adjusted, adding, by the processor, the records of the subset of records to a record set; correlating, by the processor, the records of the subset of records based on a key to obtain a filtered and correlated version of the record set; generating, by the processor and based on the filtered and correlated version of the record set, a spatial temporal graph of abnormalities associated with the cellular network; and determining, by the processor and based on the spatial temporal graph of abnormalities, a root cause of a failure associated with the cellular network.

In some embodiments, the method further can include in response to a determination that the threshold is to be adjusted, generating two or more data clusters by applying a clustering algorithm to the record set; determining a centroid for each of the two or more data clusters; and adjusting the threshold based on the centroid for each of the two or more data clusters. In some embodiments, method further can include in response to a determination that the threshold is to be adjusted, applying a k-means clustering algorithm to the record set to generate two data clusters; and determining a first centroid for a first of the two data clusters and a second centroid for a second of the two data clusters. The first centroid can be associated with a first value and the second centroid can be associated with a second value. The method also can include adjusting the threshold based on a function of the first value and the second value.

In some embodiments, the function of the first value and the second value can include an average of the first value and the second value. In some embodiments, the method further can include identifying a solution for the root cause of the failure; and outputting the solution for implementation on the cellular network. In some embodiments, applying the filter can include applying a first filter to the user equipment data to obtain a first subset of records; applying a second filter to the record set to obtain a second subset of records; and replacing the first subset of records in the record set with the second subset of records.

According to yet another aspect, a computer storage medium is disclosed. The computer storage medium can store computer-executable instructions that, when executed by a processor, cause the processor to perform operations. The operations can include obtaining, at a computing device, user equipment data from a cellular network; applying a filter having a threshold to the user equipment data to obtain a subset of records from the user equipment data; determining if the threshold is to be adjusted based on a number of the records included in the subset of records; in response to a determination that the threshold is not to be adjusted, adding the records of the subset of records to a record set; correlating the records of the subset of records based on a key to obtain a filtered and correlated version of the record set; generating, based on the filtered and correlated version of the record set, a spatial temporal graph of abnormalities associated with the cellular network; and determining, based on the spatial temporal graph of abnormalities, a root cause of a failure associated with the cellular network.

In some embodiments, the operations further can include in response to a determination that the threshold is to be adjusted, generating two or more data clusters by applying a clustering algorithm to the record set; determining a centroid for each of the two or more data clusters; and adjusting the threshold based on the centroid for each of the two or more data clusters. In some embodiments, the operations further can include in response to a determination that the threshold is to be adjusted, applying a k-means clustering algorithm to the record set to generate two data clusters; and determining a first centroid for a first of the two data clusters and a second centroid for a second of the two data clusters. The first centroid can be associated with a first value and the second centroid can be associated with a second value; and adjusting the threshold based on a function of the first value and the second value.

In some embodiments, the function of the first value and the second value can include an average of the first value and the second value. In some embodiments, the operations further can include identifying a solution for the root cause of the failure; and outputting the solution for implementation on the cellular network. In some embodiments, applying the filter can include applying a first filter to the user equipment data to obtain a first subset of records; applying a second filter to the record set to obtain a second subset of records; and replacing the first subset of records in the record set with the second subset of records. In some embodiments, applying the filter can include identifying two or more filters to be applied to the user equipment data. The two or more filters can include a first filter that can include the threshold and a second filter that can include a further threshold. The operations further can include applying the first filter to the user equipment data to obtain a first subset of records; applying the second filter to the record set and to the user equipment data to obtain a second subset of records; and replacing the first subset of records in the record set with the second subset of records.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIG. 5 is a line drawing that illustrates an example of records from one instance of user equipment data, according to an illustrative embodiment of the concepts and technologies disclosed herein.

DETAILED DESCRIPTION

Figure 1:
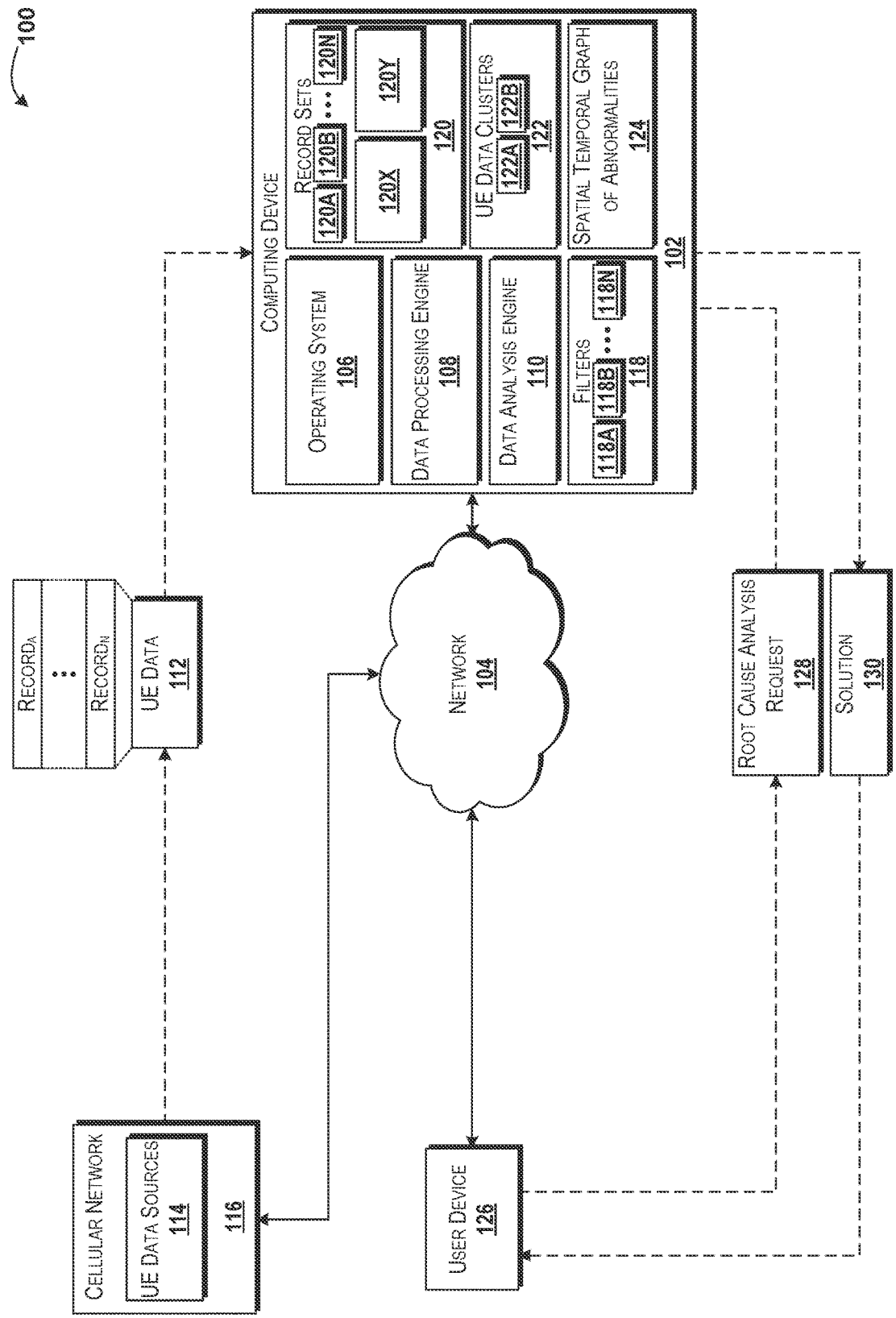
FIG. 1 is a system diagram illustrating an illustrative operating environment for various embodiments of the concepts and technologies described herein.

The following detailed description is directed to using user equipment data clusters and spatial temporal graphs of abnormalities for root cause analysis. A computing device can obtain an instance of user equipment data. The user equipment data can be obtained, in some embodiments, from a user equipment data source (for example a data source operating on a cellular network). The user equipment data can include a number of records. In some embodiments, each record can be associated with an event associated with a device such as, for example, a network device, a user equipment, or the like. In some instances, the events can correspond to failures or anomalies. The computing device can be configured to determine one or more filters to apply to the user equipment data to reduce the amount of data (e.g., a number of records) to be analyzed by the computing device.

The computing device can apply a first filter to the user equipment data and obtain multiple records that can satisfy one or more thresholds and/or parameters associated with the applied filter. After obtaining the multiple records, the computing device can determine if any thresholds associated with the filter are to be adjusted. The computing device can make this determination based on a number of records obtained by applying the filter (e.g., if the number of records obtained fails to meet a minimum threshold for the number of records, the threshold for the filter can be adjusted to capture more records in the user equipment data, while if the number of records obtained exceeds a maximum threshold for the number of records, the threshold of the filter can be adjusted to capture fewer records in the user equipment data).

If the threshold associated with the filter is to be adjusted, the computing device can apply a clustering algorithm to the records obtained by applying the filter to the user equipment data. In some instances, a k-means algorithm can be applied to the records obtained by applying the filter. In some embodiments, k is set as equal to two, and as such, the computing device can generate two data clusters. A new threshold can be determined for the filter based on the data clusters. In some embodiments, the computing device can determine a centroid for each of the two data clusters, and a value based on the two centroids (e.g., a mean, an average, or a function of the two centroid values) can be used as the new threshold for the filter. The filter (with one or more modified thresholds) can be applied to the records and/or to the user equipment data to adjust the number of records as noted above, and the records obtained by applying the modified filter can be used to create a record set.

The computing device can determine if additional filters are to be applied to the user equipment data and/or to the record set, and if so, the application of filters (and adjustment of thresholds) can be iterated until all of the identified filters have been applied and a filtered record set has been obtained (the filtered record set corresponds to the set of records obtained after applying all identified filters to the user equipment data and/or the resulting record sets). The computing device can identify one or more keys (or a key set) to apply to the filtered record set to correlate the various records included in the filtered record set, the records in the filtered record set can be correlated to one another, and a filtered and correlated record set can be output by the computing device.

The computing device can generate, based on the filtered and correlated record set, a spatial temporal graph of abnormalities. The spatial temporal graph of abnormalities can be used in association with the filtered and correlated record set to identify root causes for failures in a network (associated with the user equipment data obtained by the computing device). Once the root causes are determined by the computing device, the computing device can identify solutions for the root causes and can output commands and/or other information that can be used to resolve the root causes.

These and other aspects of the concepts and technologies disclosed herein will be illustrated and described in more detail herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of using user equipment data clusters and spatial temporal graphs of abnormalities for root cause analysis will be described, according to an illustrative embodiment of the concepts and technologies disclosed herein. The operating environment 100 shown in FIG. 1 includes a computing device 102. The computing device 102 can operate in communication with and/or as part of a communications network ("network") 104, though this is not necessarily the case.

According to various embodiments, the functionality of the computing device 102 may be provided by one or more server computers, desktop computers, mobile telephones, laptop computers, set-top boxes, other computing systems, combinations thereof, or the like. It should be understood that the functionality of the computing device 102 illustrated and described herein can be provided by a single device, by two or more similar devices, and/or by two or more dissimilar devices. For purposes of describing the concepts and technologies disclosed herein, the computing device 102 will be illustrated and described herein as a server computer. Based on the above, it should be understood that this embodiment is illustrative, and should not be construed as being limiting in any way.

The computing device 102 can execute an operating system 106 and one or more application programs such as, for example, a data processing engine 108 and a data analysis engine 110. The operating system 106 can include a computer program for controlling the operation of the computing device 102. The application programs (e.g., the data processing engine 108 and the data analysis engine 110) can include executable programs that can be configured to execute on top of the operating system 106 to provide various functions as illustrated and described herein. Although the data processing engine 108 and the data analysis engine 110 are illustrated as being hosted and/or executed by the computing device 102, it should be understood that each of these application programs and/or functionality and/or combinations thereof, may be embodied as or in stand-alone devices or components thereof operating as part of or in communication with the network 104 and/or the computing device 102. As such, the illustrated embodiment should be understood as being illustrative of only some contemplated embodiments and should not be construed as being limiting in any way.

According to various embodiments of the concepts and technologies disclosed herein, the data processing engine 108 can be configured to collect and aggregate data such as, for example, one or more instances of user equipment data 112 (labeled in FIG. 1 as "UE Data"). As shown in FIG. 1, the user equipment data 112 can include multiple data records (labeled "records" in FIG. 1). In various embodiments, each of the records included in the user equipment data 112 can correspond to a user equipment, though this is not necessarily the case.

According to various embodiments of the concepts and technologies disclosed herein, the user equipment data 112 can be collected from one or more user equipment data sources 114 (labeled in FIG. 1 as "UE data sources"). The user equipment data sources 114 can be external to and/or internal to a network such as, for example, a cellular network 116. As will be explained in more detail below, the data processing engine 108 can be configured to create and apply multiple filters 118A-118N (hereinafter collectively and/or generically referred to as "filters 118" or "filter 118") to the collected user equipment data 112 and to perform various operations on the filtered user equipment data 112. These and other functions of the data processing engine 108 will be explained in more detail below.

According to various embodiments of the concepts and technologies disclosed herein, the data processing engine 108 can be configured to obtain one or more instances or portions of user equipment data 112. The user equipment data 112 can include various types of data associated with user equipment that can operate on and/or in communication with the cellular network 116 (e.g., with one or more cells of the cellular network 116). The user equipment data 112 can also include data usage information associated with the UE, control and signaling traffic information associated with the UE, measurements associated with the UE (e.g., performance metrics, signal measurements, data usage information, etc.), handover information associated with the UE, network key performance indicators ("KPIs") associated with the UE, combinations thereof, or the like. Thus, the user equipment data 112 can include data for one or more instances of user equipment that are experiencing errors and/or failures. Typically, such errors or failures must be identified by users and/or technicians to identify root causes (of the errors or failures). Embodiments of the concepts and technologies disclosed herein can be used to provide root cause analysis for user equipment experiencing errors and/or failures. Accordingly, network operators can take appropriate actions to troubleshoot user equipment, for example using soft reboot, by adjusting specific timers, and the like. It should be understood that these examples are illustrative, and therefore should not be construed as being limiting in any way.

In various embodiments of the concepts and technologies disclosed herein, for example, the data processing engine 108 can be configured to obtain the user equipment data 112 and apply one or more filters 118 to the user equipment data 112 to identify user equipment that is experiencing failures and/or errors. For example, anomalous user equipment may be identified by filtering the user equipment data 112 based on an event associated with setup of a radio resource control ("RRC"). In one example embodiment, anomalous user equipment can be identified based on detecting occurrences of RRC-CONNECTION-SETUP events to identify user equipment having associated records with what can be defined as a "high" number of RRC-CONNECTION-SETUP events. In one contemplated example embodiment, the number defined for a "high" number of RRC-CONNECTION-SETUP events can be set to fifteen events. In another example, criteria can include identifying UEs with Reference Signal Receive Power (RSRP), Reference Signal Received Quality (RSRQ), Channel Quality Indicator (CQI)

that are less than some threshold. It should be understood that these example embodiments are illustrative, and therefore should not be construed as being limiting in any way.

After applying a first of the filters 118 to the user equipment data 112, one or more records (which can be records taken from the user equipment data 112) can be obtained for the user equipment having "high" numbers of RRC-CONNECTION-SETUP events. The data processing engine 108 can store the records that were identified from application of the first of the filters 118 and/or can provide the records that were identified from application of the first of the filters 118 to other entities for additional operations. In the illustrated embodiment of the concepts and technologies disclosed herein, the data processing engine 108 can perform pre-processing (defined herein as applying the filters 118 as illustrated and described herein) and post-processing operations (generating clusters, etc.) as illustrated and described herein, while in some other embodiments, the data processing engine 108 can perform pre-processing operations and other modules (e.g., a correlator/aggregator engine (not illustrated in FIG. 1) or other entity) can perform post-processing. It should be understood that these examples are illustrative, and therefore should not be construed as being limiting in any way.

Figure 2A:
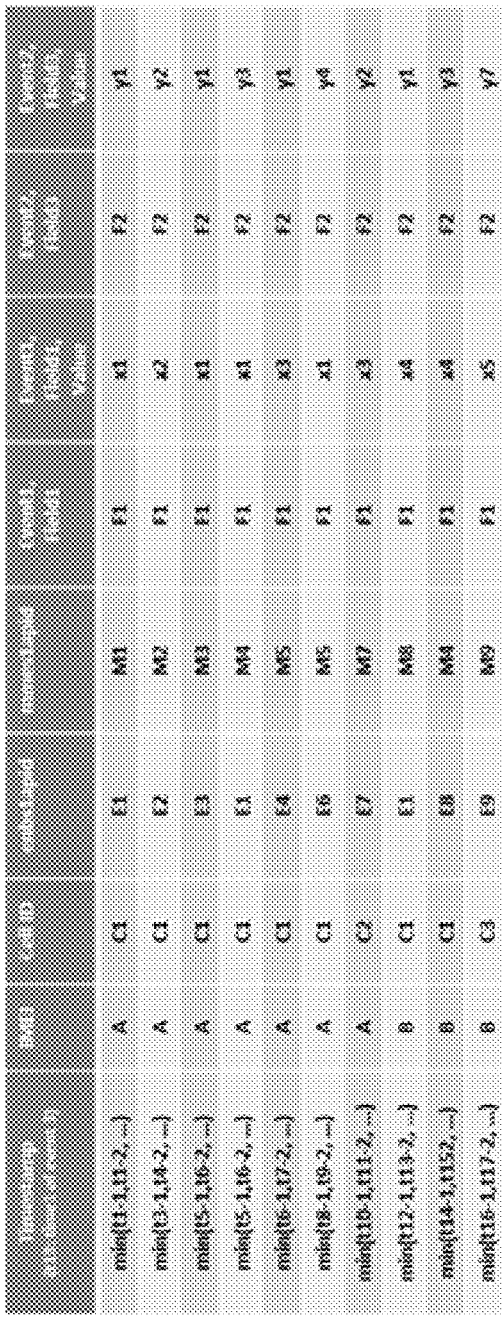
FIG. 2A is a line drawing that illustrates an example of records from one instance of user equipment data, according to an illustrative embodiment of the concepts and technologies disclosed herein.

One example of records that can be obtained or output during one or more of the pre-processing operations illustrated and described herein is shown in FIG. 2A. It should be understood that the embodiment shown in FIG. 2A is an example of only a small sample of records for illustration purposes, and that the records obtained in one or more of the pre-processing operations illustrated and described herein may include any number of records. As such, it should be understood that this example is illustrative, and therefore should not be construed as being limiting in any way. As shown in FIG. 2A, records obtained by filtering the user equipment data 112 can include timestamps; user equipment identifiers (e.g., an IMEI), cell identifiers, and/or other identifiers; event descriptors; other data; combinations thereof; or the like. These records can be used as will be illustrated and described in more detail below.

According to various embodiments of the concepts and technologies disclosed herein, the records obtained or output by applying a filter 118 can be stored or output as a first record set 120A. It should be understood that these example embodiments are illustrative and therefore should not be construed as being limiting in any way. In one contemplated embodiment of the concepts and technologies disclosed herein, the data processing engine 108 can apply a second of the filters 118 to the first record set 120A to further reduce the size of the data set being analyzed by the data analysis engine 110 (this data analysis will be explained in more detail below).

In some embodiments, for example, the data processing engine 108 can apply a second of the filters 118 to the first record set 120A to identify user equipment having a "high" number of SIGNAL-CONNECTION-SETUP events (e.g., where a "high" count can be defined as a count that exceeds a defined threshold). The identified records from application of the second of the filters 118 can be stored as a second record set 120B (or provided to other entities as noted above). In some embodiments, the data processing engine 108 also can be configured to apply the second of the filters 118 to the user equipment data 112 to identify user equipment having a "high" number of SIGNAL-CONNECTION-SETUP events, and records associated with such user equipment can also be added to the second record set 120B. It should be understood that this example is illustrative, and therefore should not be construed as being limiting in any way.

According to various embodiments of the concepts and technologies disclosed herein, any number of filters 118 can be applied to the user equipment data 112 and/or the record sets 120A-N (hereinafter collectively and/or generically referred to as "record sets 120") that are obtained through applying the filters 118 to the user equipment data 112 and/or the record sets 120. Furthermore, it should be understood that the filters 118 can be associated with any desired metrics, data, key performance indicators ("KPI's"), or the like, and that the above-disclosed examples are merely illustrative.

In various embodiments of the concepts and technologies disclosed herein, the thresholds associated with the filters 118 can be changed and/or can be dynamically adjusted during application of the filters 118 to the user equipment data 112 and/or the record set 120. In some embodiments of the concepts and technologies disclosed herein, data clustering and analysis can be used to adjust the thresholds of the filters 118. In particular, the thresholds can be adjusted in some embodiments by performing a data clustering operation on a record set 120 generated through applying a filter 118. According to various embodiments, two UE data clusters 122A-B (hereinafter collectively and/or generically referred to as "data clusters 122") can be obtained by applying a clustering algorithm such as a k-means algorithm to the record set 120, wherein k has a value of two in this example embodiment. It should be understood that other clustering algorithms can be used, and that as such, more than two data clusters 122 can be generated in some embodiments of the concepts and technologies disclosed herein. As such, the illustrated embodiment is illustrative and should not be construed as being limiting in any way.

In the illustrated embodiment (in which two data clusters 122 are generated), a centroid can be determined for each of the two data clusters 122 generated by the clustering algorithm. Once the centroids of the data clusters 122 are identified, an average or function of the two centroids can be used as the threshold value for the filter 118 being applied. It should be understood that more than two data clusters 122 can be generated in some other embodiments, and as such, the threshold can be adjusted based on two or more data clusters in various embodiments. As such, the above-disclosed embodiment using the k-means algorithm should be understood as being illustrative and should not be construed as being limiting in any way.

Once the filters 118 have been applied to the user equipment data 112 and/or the various record sets 120 as explained herein, a resulting or final filtered record set (hereinafter referred to as the "filtered record set") 120X can be obtained. It can be appreciated that the filtered record set 120X can include only records from the user equipment data 112 that meet one or more of the thresholds of the various filters 118. According to various embodiments of the concepts and technologies disclosed herein, the filtered record set 120X can be stored; provided to other applications, devices, or entities; or used for other purposes as will be explained below.

The data processing engine 108 (or an aggregator/correlator application included in the data processing engine 108 or executed separately from the data processing engine 108) also can be configured to process the filtered record set 120X. According to various embodiments, the data processing engine 108 can analyze the filtered record set 120X to identify records in the filtered record set 120X that have a same key or identifier (e.g., that are associated with the same user equipment). Thus, it can be appreciated that in various embodiments of the concepts and technologies disclosed herein, the data processing engine 108 can be configured to identify one or more keys to apply to the filtered record set 120X.

In particular, according to various embodiments, the key or identifier that is used in this operation can include, but is not limited to, an international mobile equipment identity ("IMEI"), an international mobile subscriber identity ("IMSI"), a base station S1 application entity identifier ("eNBS1APID"), a mobile management entity S1 interface access point identity ("MMES1APID"), a global-cell-id, or other identifier, name, or the like.

In some embodiments, a set of keys can be used to identify and/or correlate related records from the filtered record set 120X. For example, the data processing engine 108 can identify records in the filtered record set 120X having a same key or identifier, and then can apply one or more other keys such as timestamps, time duration, eNodeB names, scanner-id's, GUMMEI's, and/or other identifiers to a set of keys used to search the filtered record set 120X. The data processing engine 108 can be configured to apply the keys and/or a set of keys to the filtered record set 120X to identify information associated with a particular user equipment over time, location, or the like based on the various keys in the key set.

Based on the application of the one or more keys and/or set of keys, the data processing engine 108 can generate and/or output a filtered and correlated version of data from the user equipment data 112, which can include a filtered and correlated set of records (filtered and correlated record set 120Y). The filtered and correlated record set 120Y can be used to provide insight to abnormal user equipment in some embodiments. In some embodiments, a summary of the filtered and correlated record set 120Y can be output and used for various purposes (e.g., for root-cause analysis by users or operators). In some other embodiments, the filtered and correlated record set 120Y can be used for root-cause analysis by the data analysis engine 110 as will be discussed below in more detail.

According to various embodiments of the concepts and technologies disclosed herein, the data analysis engine 110 can be configured to obtain the filtered and correlated record set 120Y. According to some embodiments, the filtered and correlated record set 120Y can be provided to the data analysis engine 110 by the data processing engine 108 or other correlation and/or aggregation application or engine. According to some other embodiments, the filtered and correlated record set 120Y can be stored in a data storage device or location (e.g., a memory associated with the computing device 102, a database or data store accessible by the computing device 102, or the like) and retrieved by the data analysis engine 110. Because the data analysis engine 110 can obtain the filtered and correlated record set 120Y in additional and/or alternative manners, it should be understood that these examples are illustrative, and therefore should not be construed as being limiting in any way.

Figure 2B:
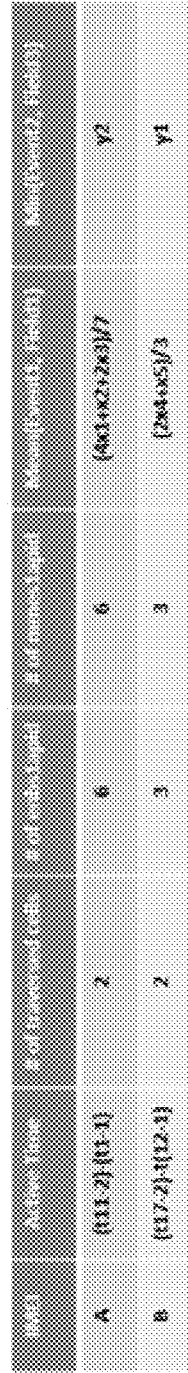
FIG. 2B is a line drawing that illustrates an example of filtered and correlated records in a record set, according to an illustrative embodiment of the concepts and technologies disclosed herein.

An example embodiment of the filtered and correlated record set 120Y is illustrated in FIG. 2B. It can be appreciated that the filtered and correlated record set 120Y shown in FIG. 2B is illustrated as having been generated based on the records shown in FIG. 2A. Thus, the embodiment is merely illustrative and provided for purposes of clarifying the concepts and technologies disclosed herein. As such, it should be understood that the example filtered and correlated record set 120Y is illustrative, and therefore should not be construed as being limiting in any way.

The data analysis engine 110 can be configured to construct and/or otherwise generate a spatial temporal graph of abnormalities 124 based on the filtered and correlated record set 120Y. According to various embodiments of the concepts and technologies disclosed herein, the construction of the spatial temporal graph of abnormalities 124 can include generating a property graph of network abnormalities. In some embodiments, for example, constructing the spatial temporal graph of abnormalities 124 can include creating two or more nodes and one or more edges that can join some of the nodes to one another. According to various embodiments of the concepts and technologies disclosed herein, each of the nodes generated by the data analysis engine 110 can have a type that defines or explains what type of entity the node represents. For example, the type can include a cell, a cell-1700 MHz, a cell 1900 MHz, a base station, a base station-type 1, a base station-type 2, a device-Smartphone, a device-CPE, other types of network elements, user equipment, combinations thereof, or the like.

Each node also can store key-value properties (e.g., based on the type associated with that node). For example, a node having a type defined as "cell" can store records of the correlated, aggregated, and processed information (e.g., records from the user equipment data 112) for the particular cell associated with that node. Thus, for example, the node associated with the cell can store records associated with abnormal user equipment in that cell over some period of time. It should be understood that this example is illustrative, and therefore should not be construed as being limiting in any way.

Figure 2C:
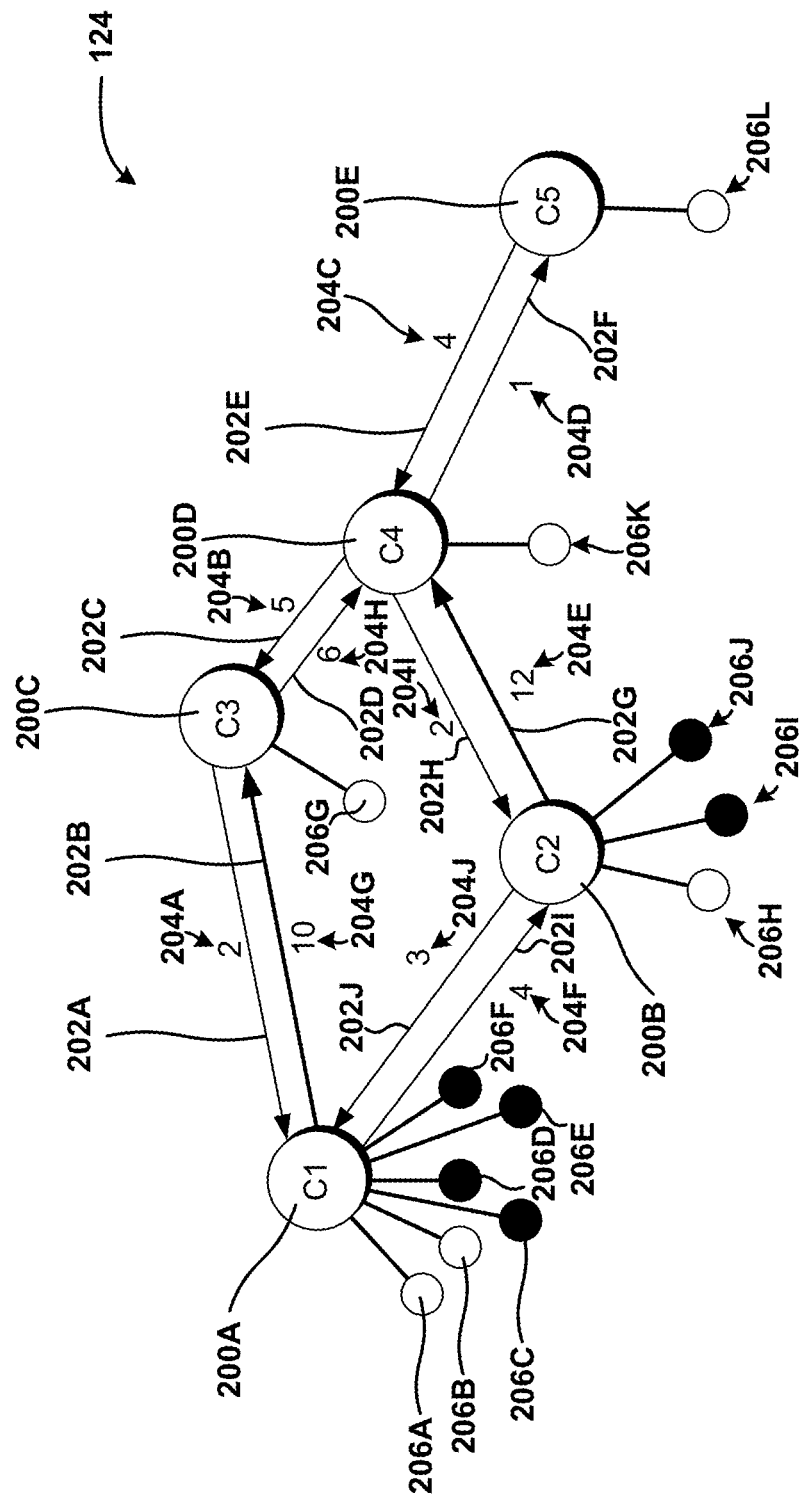
FIG. 2C is a drawing that illustrates an example spatial temporal graph of abnormalities, according to some illustrative embodiments of the concepts and technologies disclosed herein.

An example embodiment of a spatial temporal graph of abnormalities 124 is illustrated in FIG. 2C. As shown in FIG. 2C, the spatial temporal graph of abnormalities 124 can include a number of nodes 200A-E (hereinafter collectively and/or generically referred to as "nodes 200"). The nodes 200 can correspond, in the illustrated embodiment, to cells that operate on the cellular network 116. Because the nodes 200 can correspond to other entities as illustrated and described herein, it should be understood that this example is illustrative, and therefore should not be construed as being limiting in any way.

The nodes 200 can be joined to one another, in some embodiments, by one or more edges 202A-J (hereinafter collectively and/or generically referred to as "edges 202"). The edges 202 can represent the neighbor connectivity and/or number of handoffs between two or more nodes 200 (e.g., cells), and therefore the edges 202 can have an associated indicator 204A-J (hereinafter collectively and/or generically referred to as "indicator 204") that can define the number of handovers or other activity associated with the edge 202 and/or the nodes 200 joined by the edge 202. It should be understood that this example is illustrative, and therefore should not be construed as being limiting in any way.

The spatial temporal graph of abnormalities 124 also can include user equipment representations 206A-L (hereinafter collectively and/or generically referred to as "user equipment representations 206"). The user equipment representations 206 can not only represent user equipment on the cellular network 116 (e.g., connected to a respective cell represented by the nodes 200), but also can indicate user equipment having a high number of lost connections (e.g., shown in FIG. 2C as the outline user equipment representations 206) or a high number of RRC connections (e.g., shown in FIG. 2C as the solid user equipment representations 206). Thus, a review of the example embodiment of the spatial temporal graph of abnormalities 124 can reveal that nodes 200A and 200B correspond to a poor coverage area, that nodes 200C-E correspond to a coverage area that is not poor, or the like.

In various embodiments, the computing device 102 can analyze the spatial temporal graph of abnormalities 124 and identify the poor coverage areas and/or acceptable coverage areas, if desired, and can perform root cause analysis on the devices (e.g., user equipment, cell equipment, base stations, etc.) associated with the poor coverage areas to determine why the coverage is poor. In particular, it can be clear from the example spatial temporal graph of abnormalities 124 shown in FIG. 2C that the poor coverage is related to user equipment having a high number of lost connections and/or a high number of RRC connections. The computing device can be configured to take steps to address these failures (e.g., by adjusting power at equipment associated with the node 200A and 200B, or the like). It should be understood that this example is illustrative, and therefore should not be construed as being limiting in any way.

More particularly, in the illustrated embodiment shown in FIG. 2C, cells (C1-C5) are illustrated as being connected to neighboring cells and edge weights indicate a number of handovers from one cell to another one (direction of the number of handoffs indicated is shown by arrows, and magnitude of the number of handoffs is indicated by line weight). It should be understood that this example is illustrative, and therefore should not be construed as being limiting in any way.

In the illustrated example embodiment, two abnormalities have been detected (and are reflected in the spatial temporal graph of abnormalities 124). These abnormalities were detected in a short period of time (e.g., fifteen minutes). The first abnormality is a user equipment that has a high number of RRC connections (e.g., higher than thirty). The second abnormality is a user equipment that has a high number of lost connections (e.g., higher than five). Each user equipment is represented as a circle that is connected to its serving cell. In the illustrated embodiment, user equipment with a high number of RRC connections are illustrated as being uniformly distributed among all cells and they have appeared, simultaneously. This scenario could be an indication of a distributed denial of service ("DDOS") attack from user equipment having malfunctioning software, for example. Also, in the illustrated example there are illustrated user equipment in cells C1 and C2 that are experiencing high numbers of lost connections and the number of handovers between these two cells and their neighbor cells are high. This scenario could indicate poor coverage in the area of the cells C1 and C2. It should be understood that this example is illustrative, and therefore should not be construed as being limiting in any way.

According to various embodiments, the data analysis engine 110 also can be configured to determine, based on the spatial temporal graph of abnormalities 124, a root-cause for failures in the cellular network 116. In particular, in some embodiments the data analysis engine 110 can be configured to identify the root cause for failures in a network (e.g., the cellular network 116) based on detecting creation of a spatial temporal graph of abnormalities 124. In some other embodiments, the data analysis engine 110 can be configured to determine a root cause for failures in the network based on receiving, from an entity such as the user device 126, a root cause analysis request 128 or another type of request, service call, input, or the like.

The data analysis engine 110 can be configured to analyze the spatial temporal graph of abnormalities 124 to determine the root cause. Additionally, the data analysis engine 110 can be configured to identify an action that should be taken to solve the identified root cause. According to various embodiments of the concepts and technologies disclosed herein, the data analysis engine 110 can be configured to generate a solution 130 for the identified root cause. The solution 130 can include data that defines the root cause, defines a solution for the root cause, instructs other devices to address the root cause, combinations thereof, or the like. The solution 130 can be provided, in some embodiments, to the user device 126 or other entity that is configured to address the root cause of the failures. Thus, embodiments of the concepts and technologies disclosed herein can solve root causes of failures in a network.

In practice, the computing device 102 can obtain user equipment data 112. The user equipment data 112 can include a number of records, where each record can be associated, in some embodiments, with an event associated with a device such as, for example, a network device, a user equipment, or the like. The computing device 102 can be configured to determine one or more filters 118 to apply to the user equipment data 112 to reduce the amount of data to be analyzed by the computing device 102. The computing device 102 can apply a first filter 118 to the user equipment data 112 and obtain multiple records (that satisfy the applied filter 118). After obtaining the multiple records, the computing device 102 can determine if any thresholds associated with the filter 118 are to be adjusted. The computing device 102 can make this determination based on a number of records obtained by applying the filter 118 (e.g., if the number of records obtained fails to meet a minimum threshold for the number of records, the threshold for the filter 118 can be adjusted to capture more records in the user equipment data 112, while if the number of records obtained exceeds a maximum threshold for the number of records, the threshold of the filter 118 can be adjusted to capture fewer records in the user equipment data 112).

If the threshold associated with the filter 118 is to be adjusted, a clustering algorithm can be applied to the records obtained by applying the filter 118 to the user equipment data 112. In some instances, a k-means algorithm can be applied to the records obtained by applying the filter 118. In some embodiments, k is set as equal to two, so two data clusters 122 can be generated by the computing device 102. A new threshold can be determined for the filter 118 based on the data clusters 122. In some embodiments, the computing device 102 can determine a centroid for each of the data clusters 122, and a value based on the two centroids (e.g., a mean, an average, or a function of the two centroid values) can be used as the new threshold for the filter 118. The filter 118 (with one or more modified thresholds) can be applied to the records and/or to the user equipment data 112 to adjust the number of records as noted above, and the records obtained by applying the modified filter 118 can be used to create a record set 120.

The computing device 102 can determine if additional filters 118 are to be applied to the user equipment data 112 and/or to the record set 120, and if so, the application of filters 118 (and adjustment of thresholds) can be iterated until all of the identified filters 118 have been applied and a filtered record set 120X has been obtained (the filtered record set 120X corresponds to the set of records obtained after applying all identified filters 118 to the user equipment data 112 and/or the resulting record sets 120). The computing device can identify one or more keys (or a key set) to apply to the filtered record set 120X to correlate the various records included in the filtered record set 120X, the records in the filtered record set 120X can be correlated to one another, and a filtered and correlated record set 120Y can be output by the computing device 102.

The computing device 102 can generate, based on the filtered and correlated record set 120Y, a spatial temporal graph of abnormalities 124. The spatial temporal graph of abnormalities 124 can be used in association with the filtered and correlated record set 120Y to identify root causes for failures in a network (associated with the user equipment data 112 obtained by the computing device). Once the root causes are determined by the computing device 102, the computing device 102 can identify solutions for the root causes and can output commands and/or other information that can be used to resolve the root causes.

According to various embodiments of the concepts and technologies disclosed herein, the computing device 102 can be configured to generate and/or provide one or more visualizations and/or notifications to various entities (e.g., network operators or other entities). The visualizations can represent abnormal cells, UEs, or other devices and/or entities along with indications relating to their behavior (e.g., operating properly, malfunctioning and/or abnormally behaving, etc.). In one contemplated embodiment, a visualization can include a map view that can include a representation of a map with network equipment (e.g., cells, UEs, base stations, etc.) in positions that correspond to their geographic location. Indicators associated with the network equipment (e.g., color coded indicators, icons, avatars, etc.) can be coded (e.g., color coded, pattern coded, etc.) and/or labeled to indicate their status (e.g., operating normally, malfunctioning, etc.). Thus a user or other entity can determine, with short reference to the visualization, where malfunctions in the network exist and/or what their causes are. It should be understood that this example is illustrative, and therefore should not be construed as being limiting in any way.

FIG. 1 illustrates one computing device 102, one network 104, one cellular network 116, one instance of user equipment data sources 114, and one user device 126. It should be understood, however, that various implementations of the operating environment 100 can include one or more than one computing device 102; one or more than one network 104; one or more than one cellular network 116 or other network; one or more than one instance of user equipment data 112; and/or zero, one, or more than one user device 126. As such, the illustrated embodiment should be understood as being illustrative, and should not be construed as being limiting in any way.

Figure 3:
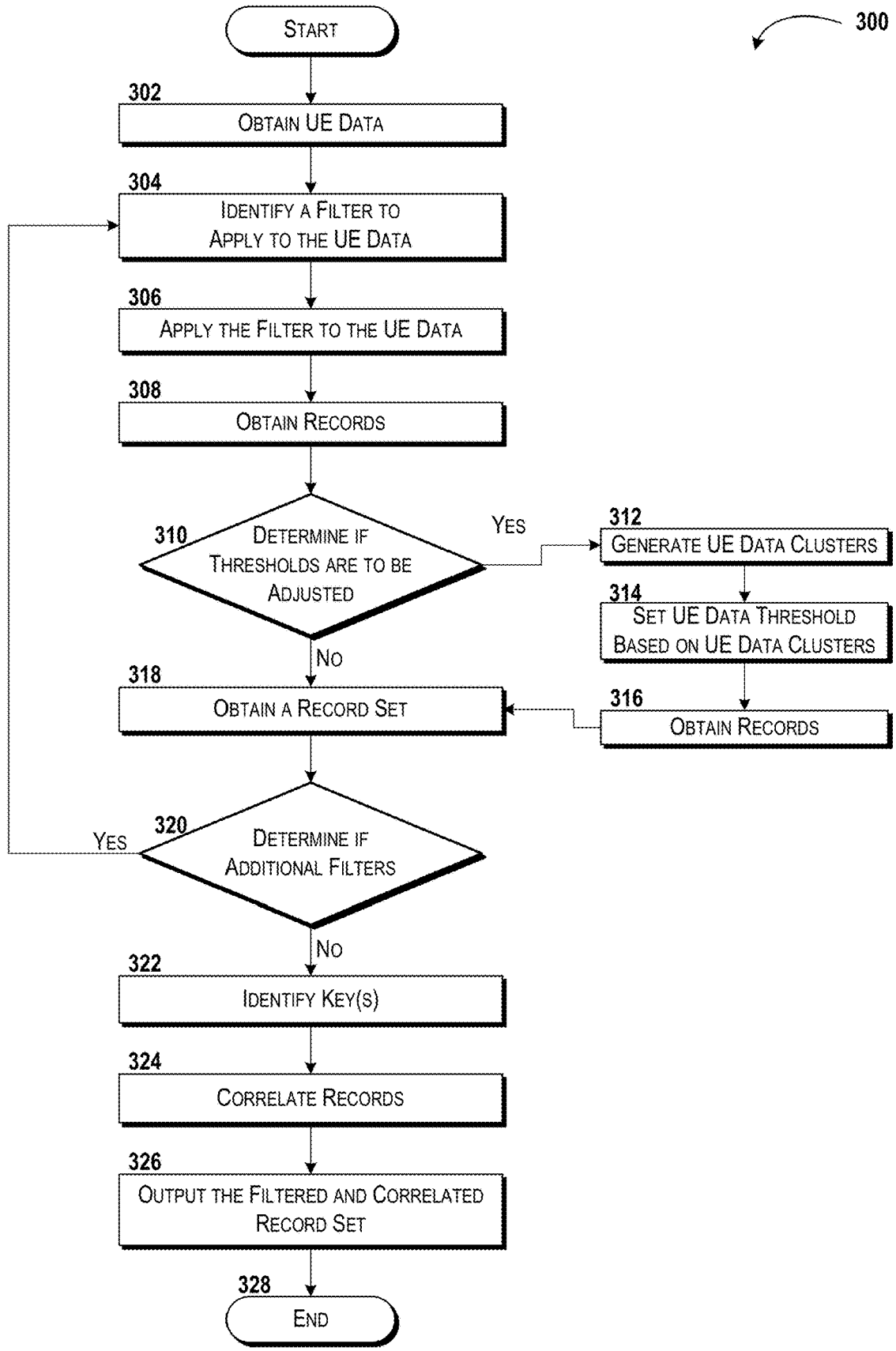
FIG. 3 is a flow diagram showing aspects of a method for determining a user equipment data threshold using a user equipment data clusters, according to an illustrative embodiment of the concepts and technologies described herein.

Turning now to FIG. 3, aspects of a method 300 for determining a user equipment data threshold using user equipment data clusters will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the method 300 is described herein as being performed by the computing device 102 via execution of one or more software modules such as, for example, the data processing engine 108. It should be understood that additional and/or alternative devices and/or network nodes can provide the functionality described herein via execution of one or more modules, applications, and/or other software including, but not limited to, the data processing engine 108. Thus, the illustrated embodiments are illustrative, and should not be viewed as being limiting in any way.

The method 300 begins at operation 302. At operation 302, the computing device 102 can obtain an instance of data such as, for example, an instance of the user equipment data 112 illustrated and described in FIG. 1. According to various embodiments of the concepts and technologies disclosed herein, the user equipment data 112 can include a number of records that can be generated by one or more of the user equipment data sources 114. The records can correspond, in some embodiments, to events associated with the cellular network 116 (or other network). Thus, for example, one of the records included in the user equipment data 112 can reflect connection of a user equipment to the cellular network 116, a dropped call associated with the user equipment, or any other event that can be reported in the cellular network 116. In some embodiments, the user equipment data 112 can reflect only errors or faults associated with the cellular network 116 and as such, a record of the user equipment data 112 can reflect an error or fault associated with a user equipment, a cell, a base station, an eNodeB, or other equipment. It should be understood that this example is illustrative, and therefore should not be construed as being limiting in any way.

From operation 302, the method 300 can proceed to operation 304. At operation 304, the computing device 102 can identify a filter 118 to apply to the user equipment data 112 obtained in operation 302. According to various embodiments of the concepts and technologies disclosed herein, the computing device 102 can be configured to identify, in operation 304, each filter 118 that is to be applied to the user equipment data 112 and/or to one or more record sets 120 obtained based on application of the one or more filters 118 to the user equipment data 112. Thus, in some embodiments the computing device 102 can identify multiple filters 118 in operation 304, whereas in some other embodiments the computing device 102 can be configured to identify one filter 118 in each iteration of operation 304.

According to various embodiments of the concepts and technologies disclosed herein, the filters 118 can have and/or can define one or more thresholds. For example, a filter 118 associated with an RRC connection count (e.g., a filter 118 that searches the user equipment data 112 for RRC-CONNECTION-SETUP events) can have a threshold of twenty per fifteen minute interval. It should be understood that this example is illustrative, and therefore should not be construed as being limiting in any way. Thus, any user equipment that experiences more than twenty RRC-CONNECTION-SETUP events in any fifteen minute interval can be considered anomalous and data associated with that user equipment can be filtered out of the user equipment data 112 (e.g., by application of the filter 118 with the example thresholds noted above) for analysis as illustrated and described herein. It should be understood that this example is illustrative, and therefore should not be construed as being limiting in any way. According to various embodiments of the concepts and technologies disclosed herein, multiple filters 118 can be defined and each filter 118 can have one or more thresholds if desired.

From operation 304, the method 300 can proceed to operation 306. At operation 306, the computing device 102 can apply the filter 118 (or one filter 118 of multiple filters 118) identified in operation 304. As explained above, the computing device 102 can analyze the user equipment data 112 and identify any records included in the user equipment data 112 that satisfy the one or more thresholds defined for the filter 118 identified in operation 304. Thus, for example, if the user equipment data 112 is filtered using a filter 118 that defines a high number of RRC-CONNECTION-SETUP events as being more than twenty in a fifteen minute interval, operation 306 could include identifying records in the user equipment data 112 that are associated with devices or entities that experienced twenty one or more RRC-CONNECTION-SETUP events in any fifteen minute interval. Of course, this example is merely illustrative of the concepts and technologies disclosed herein and should not be construed as being limiting in any way.

Operation 306 therefore can correspond to the computing device 102 analyzing the user equipment data 112 to identify records that satisfy any filter 118 being applied. In some embodiments of the concepts and technologies disclosed herein, as noted above with reference to FIG. 1, subsequent iterations of operation 306 can include applying a filter 118 to the user equipment data 112 and one or more record sets 120. It should be understood that this example is illustrative, and therefore should not be construed as being limiting in any way.

From operation 306, the method 300 can proceed to operation 308. At operation 308, the computing device 102 can obtain one or more records. In particular, in operation 308, the computing device 102 can obtain the records by applying the filter 118 identified in operation 306 to the user equipment data 112, and identifying those records (from the user equipment data 112) that satisfy one or more thresholds associated with the filter 118 identified in operation 306.

From operation 308, the method 300 can proceed to operation 310. At operation 310, the computing device 102 can determine if one or more thresholds associated with the filter 118 applied in operation 306 is or are to be adjusted. According to various embodiments of the concepts and technologies disclosed herein, the computing device 102 can determine that one or more thresholds associated with the filter 118 are to be adjusted based on an amount of records or other data obtained in operation 308 (e.g., by applying the filter 118 to the user equipment data 112).

In particular, the computing device 102 can be configured to adjust the thresholds of the filter 118 being applied based on a number of records (or other instances of data) being higher than a defined number and/or lower than a defined number. In some example embodiments, the number of records can be defined programmatically and/or by configurations or settings, and operation 310 can correspond to the computing device 102 determining that more than that number of records or other instances of data or less than that number of records or other instances of data have been obtained via application of the filter 118 to the user equipment data 112.

In one example embodiment, the number of records or other instances of data can be set as a range between ten and one hundred records, one hundred and one thousand records, ten and ten thousand records, or the like. Thus, if the number of records or other instances of data obtained in operation 308 is less than the defined number or more than the defined number, the computing device 102 can determine, in operation 310, to adjust the thresholds to correspondingly reduce or increase the number of records or other instances of data obtained by applying the filter 118. Because the thresholds can be adjusted for additional and/or alternative manners (e.g., periodically adjusted, adjusted based on a number of iterations, adjusted based on a lack or surplus of data identified during the filtering, etc.), it should be understood that the above example is illustrative, and therefore should not be construed as being limiting in any way.

If the computing device 102 determines in operation 310 that one or more of the thresholds associated with the filter 118 applied in operation 306 is or are to be adjusted, the method 300 can proceed to operation 312. At operation 312, the computing device 102 can access output from the filter 118 applied in operation 306, for example, one of the record sets 120 as illustrated and described in FIG. 1 and as obtained in operation 308, and the computing device 102 can generate two or more user equipment data clusters 122 based on the data in the record set 120. According to various embodiments of the concepts and technologies disclosed herein, the computing device 102 can apply a clustering algorithm to the record set 120.

In some embodiments, the clustering algorithm applied by the computing device 102 can include, for example, a k-means algorithm. The computing device 102 can apply the clustering algorithm to the record set 120 obtained in operation 308 to generate the two or more user equipment data clusters 122. In some embodiments, the k-means algorithm can be chosen because the k-means algorithm can be used to cluster the data into multiple distinct groups or clusters (without overlap), and the number two can be used for k in some embodiments to keep data analysis simple and efficient. Thus, while the k-means algorithm and two data clusters 122 is a preferred embodiment, other clustering techniques and/or algorithms, and other numbers of data clusters 122, are possible and are contemplated. It should be understood that this example is illustrative, and therefore should not be construed as being limiting in any way.

From operation 312, the method 300 can proceed to operation 314. At operation 314, the computing device can adjust the one or more thresholds associated with the filter 118 applied in operation 306. According to one example embodiment, where the k-means algorithm is used with a value of two for k, a centroid can be determined for each of the two data clusters 122 generated by the k-means algorithm. Once the centroids of the data clusters 122 (or a value associated with the centroids of the data clusters 122) are identified, an average or function of the two centroids of the two data clusters 122 can be determined, and that value can be used as the adjusted threshold value for the filter 118 being applied.

For example, if a first centroid of a first data cluster 122A generated in operation 314 has a value of forty and a second centroid of a second data cluster 122B generated in operation 314 has a value of thirty, the computing device 102 can determine that the threshold of the filter 118 applied in operation 306 should be adjusted to thirty five. By way of example, a filter 118 associated with the RRC-CONNECTION-SETUP event can have (in one example embodiment) a threshold of twenty in fifteen minutes. If that filter 118 is applied and results in thousands of records, the threshold may be changed to capture less data. Adjusting the threshold using this approach can be used to set, adjust, or modify the thresholds of the filter 118 to make the data set being used for root-cause analysis more manageable and/or for other reasons. It should be understood that this example is illustrative, and therefore should not be construed as being limiting in any way.

From operation 314, the method 300 can proceed to operation 316. At operation 316, the computing device 102 can again obtain one or more records. In particular, in operation 316, the computing device 102 can obtain records by applying the filter 118 identified in operation 306 (with its thresholds adjusted as determined in operation 314) to the records obtained in operation 308 to identify records that satisfy the one or more adjusted thresholds (as adjusted in operation 314) associated with the filter 118 identified in operation 306. The records obtained in operation 308 can be filtered out in operation 316 to retain only those records that meet the adjusted thresholds. In some other embodiments, the filter 118 can be reapplied to the user equipment data 112. Regardless of how the filter 118 is applied in operation 316, the records that satisfy the adjusted thresholds can be obtained.

From operation 316, the method 300 can proceed to operation 318. The method 300 also can proceed to operation 318 if, in operation 310, the computing device 102 determines that one or more of the thresholds associated with the filter 118 applied in operation 306 is or are not to be adjusted. At operation 318, the computing device 102 can obtain a record set 120. If the method 300 proceeds to operation 318 from operation 310, the record set 120 obtained in operation 318 can include the records identified in operation 308. If the method 300 proceeds to operation 318 from operation 316, then the record set 120 obtained in operation 318 can include the records identified in operation 316. According to various embodiments of the concepts and technologies disclosed herein, the record set 120 obtained in operation 318 can be stored by the computing device 102 at a local or remote data storage location, output for storage by other entities, stored in a cache, output for other devices and/or uses, or the like. Thus, the term "obtain" with regard to the record set 120 in operation 318 can include outputting the record set 120, storing the record set 120, using the record set 120, and/or providing the record set 120 to other entities.

From operation 318, the method 300 can proceed to operation 320. In operation 320, the computing device 102 can determine if additional filters 118 are to be applied to the user equipment data 112 and/or to the record sets 120 obtained in operations 308 and/or 318. As explained above with reference to FIG. 1, the computing device 102 can be configured to apply one or more filters 118 to the user equipment data 112 and/or to one or more record sets 120 obtained via application of the filter 118 to the user equipment data 112.

Thus, operation 320 can correspond to the computing device 102 determining if another filter 118 is to be applied to the user equipment data 112 and/or if each of the one or more filters 118 that previously have been identified have been applied to the user equipment data 112 and/or the record sets 120. For example, in some embodiments of operation 304 the computing device 102 can identify one or more filters 118 that are to be applied to the user equipment data 112 and/or the record sets 120 and operation 320 can correspond to the computing device 102 determining if each of the filters 118 identified has been used. In some other embodiments of operation 320, the computing device 102 can identify additional filters 118 that are to be applied to the user equipment data 112 and/or the record sets 120 and determine if any additional filters 118 remain to be applied in the same operation. Because the determination as to whether more filters 118 are to be applied can be accomplished in additional and/or alternative manners, it should be understood that these examples are illustrative, and therefore should not be construed as being limiting in any way.

If the computing device 102 determines, in any iteration of operation 320, that additional filters 118 are to be applied to the user equipment data 112 and/or the one or more record sets 120 obtained in operation 318, the method 300 can return to operation 304, a next filter 118 can be identified for application to the user equipment data 112 and/or the record sets 120, and the application of the filter 118 and/or adjustment of thresholds can be repeated as illustrated and described above with reference to operations 304 through 318, and the functionality of operation 320 can also be repeated to determine if additional filters 118 are to be applied to the user equipment data 112 and/or the record sets 120 obtained in the one or more iterations of operation 318. Operations 304 through 320 can be repeated until the computing device 102 determines, in any iteration of operation 320, that additional filters 118 are not to be applied to the user equipment data 112 and/or the one or more record sets 120 obtained in the one or more iterations of operation 318.

It should be understood that in some embodiments of the concepts and technologies disclosed herein, the record set 120 obtained in operation 318 can be updated in each iteration of operation 318 and/or that a record set 120 can be obtained for each iteration of operation 318. In some embodiments, a single record set 120 is obtained each time the operations 304-318 are iterated, and as such, the final iteration of operation 318 results in obtaining a single record set 120 that satisfies each of the one or more filters 118 applied in the one or more iterations of operations 304-318. It should be understood that this example is illustrative, and therefore should not be construed as being limiting in any way.

If the computing device 102 determines, in any iteration of operation 320, that additional filters 118 are not to be applied to the user equipment data 112 and/or the one or more record sets 120 obtained in the one or more iterations of operation 318, the method 300 can proceed to operation 322. At operation 322, the computing device 102 can identify one or more keys to apply to the record set 120. In particular, as noted above, the key or identifier can include an identifier or name with which each record is associated such as, for example, an IMEI, an IMSI, an eNBS1APID, an MMES1APID, a global-cell-id, or other identifier, name, or the like. Other keys and/or sets of keys can be used to correlate the records and/or other data included in the record set 120 obtained in operation 318 with one another. For example, keys can also include timestamps, eNodeB names, scanner-id's, GUMMEI's, locations, power profiles, and/or other information that can be used to further correlate records or other data having a same identifier or other key. Because other keys are possible and are contemplated, it should be understood that these examples are illustrative, and therefore should not be construed as being limiting in any way.

From operation 322, the method 300 can proceed to operation 324. At operation 324, the computing device 102 can correlate one or more records associated with the record set 120 using the keys identified in operation 322. According to various embodiments of the concepts and technologies disclosed herein, operation 324 can correspond to the computing device 102 analyzing records in the record set 120 to identify records that are related (e.g., records that have the same key or same set of keys identified in operation 322). As explained above, one or more keys (or a set of keys) can be used to identify and/or correlate related records from the record set 120 obtained in operation 318. For example, the computing device 102 can identify records in the record set 120 having a same key or identifier, and then can apply one or more other keys such as timestamps, eNodeB names, scanner-id's, GUMMEI's, location, and/or other information to the record set 120 to correlate related records. Thus, the computing device 102 can identify, in the record set 120 obtained in operation 318, records or other data associated with a particular user equipment over time, location, or the like based on the various keys in the key set. It should be understood that this example is illustrative, and therefore should not be construed as being limiting in any way.

From operation 324, the method 300 can proceed to operation 326. At operation 326, the computing device 102 can obtain a filtered and correlated version of the record set 120 such as, for example, the filtered and correlated record set 120Y illustrated and described with reference to FIG. 1. Based on the application of the one or more keys and/or set of keys, the computing device 102 can generate and/or output a filtered and correlated record set 120Y. The filtered and correlated record set 120Y can be used to provide insight to abnormal user equipment in some embodiments. In some embodiments, a summary of the filtered and correlated record set 120Y can be output and used for various purposes (e.g., for root-cause analysis by users or operators). In some other embodiments, the filtered and correlated record set 120Y can be used for root-cause analysis by the data analysis engine 110 as will be discussed below in more detail, particularly with reference to FIG. 4.

According to various embodiments of the concepts and technologies disclosed herein, the filtered and correlated record set 120Y obtained in operation 326 can be stored by the computing device 102 at a local or remote data storage location, output by the computing device 102 for storage and/or use by other entities, stored by the computing device 102 in a cache or other temporary data storage resource, and/or otherwise stored, output, or used. Thus, the term "obtain" with regard to the filtered and correlated record set 120Y in operation 326 can include outputting the filtered and correlated record set 120Y, storing the filtered and correlated record set 120Y, using the filtered and correlated record set 120Y, and/or providing the filtered and correlated record set 120Y to other entities.

From operation 326, the method 300 can proceed to operation 328. The method 300 can end at operation 328.

Figure 4:
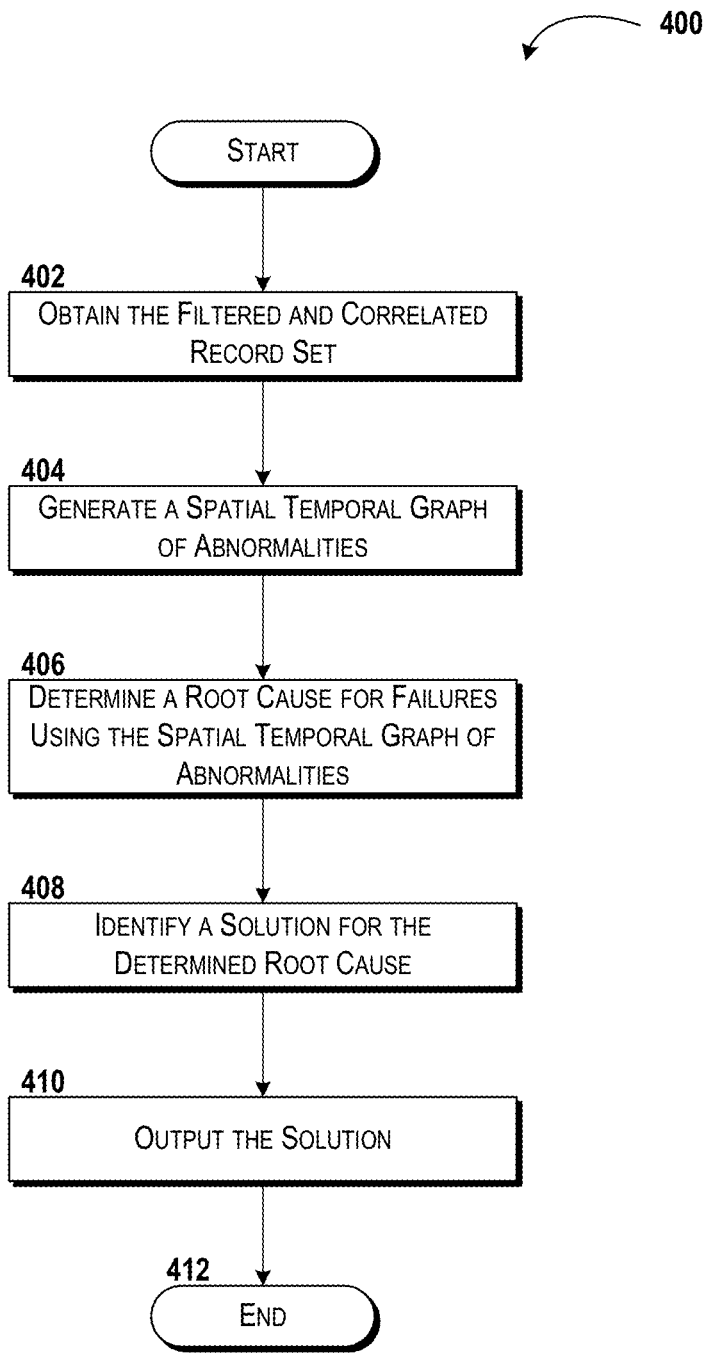
FIG. 4 is a flow diagram showing aspects of a method for performing root cause analysis using a spatial temporal graph of abnormalities, according to an illustrative embodiment of the concepts and technologies described herein.

Turning now to FIG. 4, aspects of a method 400 for performing root cause analysis using a spatial temporal graph of abnormalities will be described in detail, according to an illustrative embodiment. For purposes of illustrating and describing the concepts of the present disclosure, the method 400 is described herein as being performed by the computing device 102 via execution of one or more software modules such as, for example, the data analysis engine 110. It should be understood that additional and/or alternative devices and/or network nodes can provide the functionality described herein via execution of one or more modules, applications, and/or other software including, but not limited to, the data analysis engine 110. Thus, the illustrated embodiments are illustrative, and should not be viewed as being limiting in any way.

The method 400 begins at operation 402. At operation 402, the computing device 102 can obtain the filtered and correlated data output in operation 326 of the method 300, for example the filtered and correlated record set 120Y. As noted above, the filtered and correlated record set 120Y can be stored by the computing device 102, output by the computing device 102 for storage and/or use by other entities, stored by the computing device 102 in a cache or other temporary data storage resource, and/or otherwise stored, output, or used. Thus, in operation 402, the computing device 102 can retrieve the filtered and correlated record set 120Y from a memory, cache, or data storage device or resource; receive the filtered and correlated record set 120Y from other entities; or otherwise obtain the filtered and correlated record set 120Y.

In some embodiments, though not shown in FIG. 4, the computing device 102 can obtain the filtered and correlated record set 120Y in response to receiving a service call, program call, request, command, or the like for a root-cause analysis. In some embodiments, for example, the computing device 102 can receive a root cause analysis request 128 from a requestor (e.g., the user device 126 shown in FIG. 1). The request or command can be received via a portal, user interface, application programming interface ("API"), and/or other functionality that can be exposed by the computing device 102 in some embodiments. As such, it can be appreciated that the functionality of FIG. 4 can be performed in response to a command, request, input, or the like, or at other times or in response to other events.

From operation 402, the method 400 can proceed to operation 404. At operation 404, the computing device 102 can generate a spatial temporal graph of abnormalities 124 based on the filtered and correlated record set 120Y obtained in operation 402. As noted above, each node 200 of the spatial temporal graph of abnormalities 124 can represent a different entity in the cellular network 116 such as, for example, cells, base stations, user equipment, and/or other network elements and/or devices. Each node 200 can have a type variable or parameter that can define a type associated with the node 200 (e.g., cell, smartphone, base station, etc.).

Each node 200 also can have an associated key value property (e.g., that can be based on its type). For example, a node 200 that represents a cell of a cellular network 116 can store records of the record set 120 that are associated with that particular cell. Thus, for example, a particular user equipment ($UE_1$) may interact with a particular cell ($CELL_1$) and various records associated with that interaction may be generated (e.g., on the occurrence of various events, faults, or the like). In this example, any records from the record set 120 that are associated with $CELL_1$ can be stored in the node 200 associated with $CELL_1$. Additionally, the node 200 can store records associated with a particular time interval, and as such, the records associated with $CELL_1$ can be limited, in some embodiments, to records having a timestamp during the defined time interval. It should be understood that this example is illustrative, and therefore should not be construed as being limiting in any way.

Furthermore, as noted above, edges 202 between the nodes 200 can be generated as directed or undirected edges. The edges 202 can have different types and therefore may indicate different types of relationships between the nodes 200. For example, cells and base stations may be connected to neighbor cells or neighbor base stations. Each edge 202, then, can store a set of key-values properties. Thus, for example, an edge 202 having a type "handover" can represent records from the record set 120, where those records indicate or represent handover events such as, for example, a number of successful handovers, a number of failed handovers (e.g., dropped calls) of abnormal user equipment from one cell to another cell, etc., and these records also can be restricted based on timestamps (e.g., events during a particular time interval). In another embodiment, an edge 202 of a type "device" can show a ration of abnormal user equipment of a particular type (e.g., SAMSUNG GALAXY, or the like) in a particular cell and/or relative to another cell, and these records also can be restricted based on time (e.g., over a particular time interval) in some embodiments. In some embodiments, the edge values (e.g., weights) can be computed using a function of one or more and/or a function of one or more parameters.

According to various embodiments, information from internal and/or external data sources can be incorporated into values (e.g., key values) associated with the nodes 200 and/or the edges 202 of the spatial temporal graph of abnormalities 124. In particular, information such as a type of environment for each cell (e.g., rural, urban, suburban, or the like) can be incorporated into values associated with the nodes 200 and/or the edges 202. Additionally, or alternatively, location information such as a latitude and/or longitude, ZIP code, or the like for each cell can be incorporated into values associated with the nodes 200 and/or the edges 202.

Additionally, or alternatively, configuration parameters for each cell (e.g., frequency, antenna azimuth, antenna tilt, propagation model, power levels, etc.) can be incorporated into values associated with the nodes 200 and/or the edges 202. Additionally, or alternatively, utilization information for each cell (e.g., cell load, network utilization, etc.) can be incorporated into values associated with the nodes 200 and/or the edges 202. Additionally, or alternatively, location and/or movement information for each user equipment (e.g., location, trajectory, movement, etc.) can be incorporated into values associated with the nodes 200 and/or the edges 202.

Additionally, or alternatively, cell heat maps (e.g., stored as an array or the like) can be incorporated into values associated with the nodes 200 and/or the edges 202. Additionally, or alternatively, weather and/or traffic information can be incorporated into values associated with the nodes 200 and/or the edges 202. These and other types of information can be used to assign values to the nodes 200 and/or the edges 202. Because other types of information can be used in accordance with various embodiments of the concepts and technologies disclosed herein, it should be understood that these examples are illustrative, and therefore should not be construed as being limiting in any way.

From operation 404, the method 400 can proceed to operation 406. At operation 406, the computing device 102 can determine a root cause of failures using the spatial temporal graph of abnormalities 124 generated in operation 404. In some embodiments, the functionality of operation 406 can be performed by the computing device 102 by further processing the filtered and correlated record set 120Y (e.g., using the spatial temporal graph of abnormalities 124), while in some other embodiments the functionality of operation 404 can be based on the spatial temporal graph of abnormalities 124.

According to various embodiments, the spatial temporal graph of abnormalities 124 can be used for identifying the root cause of abnormalities. For example, a user equipment having a high number of UE-capability-enquiry-timeout, for example, could result from a device issue, from a poor RF coverage issue, from a network element malfunction, or the like. The use of the spatial temporal graph of abnormalities 124 to identify issues in a network (e.g., the cellular network 116) can also help determine the cause of the issue and solutions can thereby be identified (and commanded for implementation in some embodiments) based on the root cause analysis. In some embodiments of the concepts and technologies disclosed herein, a neo4j graph database can be used to store the data and to apply analysis effectively and efficiently using the Cypher language. It should be understood that this example is illustrative, and therefore should not be construed as being limiting in any way.

Using the spatial temporal graph of abnormalities 124, the computing device 102 can determine if there is any correlation between abnormal user equipment and the configuration parameters associated with the network and/or network elements. Thus, the computing device can determine if cell configuration parameters should be adjusted to address the abnormal user equipment behavior (e.g., the computing device can determine if antenna tilt, azimuth, or the like should be remotely changed; if power parameters should be adjusted; etc.). Additionally, in some embodiments the computing device can identify geographic areas or portions of the network (e.g., cells of the network, coverage areas, etc.) with coverage issues such as, for example, a high number of lost connections. These portions of the network and/or geographic areas can be identified as coverage holes and the computing device can inform other devices or entities to resolve the issues identified, in some embodiments.

Additionally, the computing device 102 can identify a device type for each user equipment associated with an abnormality. Thus, the computing device 102 can correlate errors and or faults to identify device issues and/or can inform device teams or other entities to investigate device issues. Additionally, the computing device 102 can identify security issues and network attacks such as DDOS attacks based on, for example, the appearance of one or more abnormal user equipment having a large number of RRC connections that repeatedly and/or simultaneously appear and/or can inform network operations or other entities to investigate and/or resolve such issues. Additionally, the computing device 102 can apply analysis on the information in this graph (e.g., using spectral graph analysis or the like) to identify anomalies and/or security attacks. It should be understood that these examples are illustrative, and therefore should not be construed as being limiting in any way.

After applying the root cause analysis, the computing device 102 can label the records in the filtered and correlated record set 120Y. In one embodiment, the labeling of each record (e.g., each row illustrated in FIG. 2C) can be based on the source of abnormalities; for example, an abnormal user equipment, poor RF performance of a network, malfunctioning of a network element, or the like. Moreover, over time and by collecting and aggregating information of abnormal user equipment from different sources and/or events, the computing device can develop supervised and/or unsupervised machine learning models to identify different clusters of abnormalities and recommended (automatic) resolution systems (e.g., solutions for specific types of abnormalities), which can be based, for example, on actions taken by network operations to resolve abnormalities, etc. Thus, the computing device 102 can be configured to identify solutions, for example, from a solution database or other library and output those solutions in some embodiments.

Figure 5:
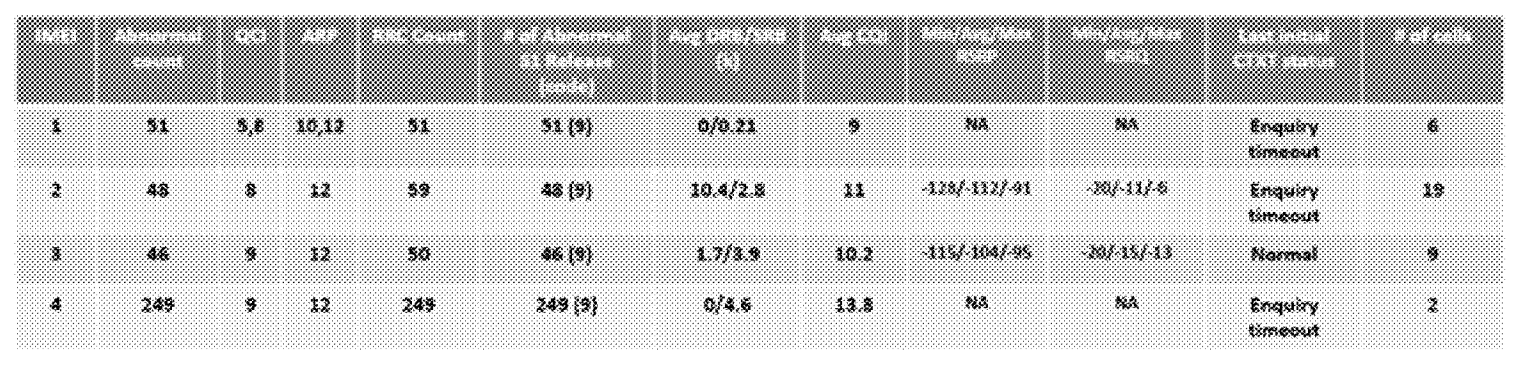

An example embodiment of operation 406 will now be described, referring to the data shown in FIG. 5 as an example of a filtered and correlated record set 120Y. In the example shown in FIG. 5, records associated with user equipment having abnormal behaviors are shown. In the example embodiment, there are four instances of user equipment (e.g., four IMEI's) having a high number of UE-capability-enquiry-timeout (illustrated under the column that is labeled abnormal count). In the example embodiment, the user equipment being considered are providing streaming video, web, and email applications as indicated by the QoS Class Identifier ("QCI"). The RRC and S1-Signal connections are established and, in the majority of the time for the illustrated embodiment, the connections are released with S1-release code indicating RELEASE_DUE_TO_EUTRAN_GENERATED_REASON (code=9). This code does not indicate the main cause of the abnormal release, but that information can be used to rely on the information from one event UE-Context-Release.

Using embodiments of the concepts and technologies disclosed herein, however, it can be determined that these abnormal releases are resulting from associated eNodeB's querying for info that the user equipment cannot transmit or that the eNodeB does not receive. By examining the average CQI column (labeled Avg. CQI in FIG. 5), the minimum, average, and/or maximum reference signal received power ("RSRP") column (labeled Min/Avg/Max RSRP in FIG. 5), and the minimum, average, and/or maximum reference signal received quality ("RSRQ") column (labeled Min/Avg/Max RSRQ in FIG. 5), it can be determined that these user equipment do not necessarily experience a poor RF channel quality or low signal power/quality. Furthermore, it can be determined that these multiple user equipment devices travel among a high number of cells. As such, the possibility of having poor RF coverage in all cells is low and another cause must be examined.

According to various embodiments, network/cell utilization (e.g., as determined based on data from the same source or other network and/or KPI data sources) for the cells that this user equipment visits can be examined. If the cell loads and/or utilizations are not high, then the root cause of the failures can be most likely attributed to the user equipment (e.g., these user equipment can be determined to be abnormal user equipment having one or more device issues and/or one or more software issues). In the illustrated embodiment, data usage for these user equipment can be low but the signaling usage may be present, which is an overhead for the network. Accordingly, appropriate actions (e.g., a reset and/or reboot of the one or more user equipment, reconfiguring of user equipment timers, observing the user equipment over a period of time, a mandatory handover to neighbor cells, temporary removal of the user equipment or the like) may be taken to reduce the overhead of such a user equipment on the network. In addition, various entities (e.g., a device team, operations, or the like) can be informed for more investigation on the device type.

If, instead, the CQI/RSRP/RSRQ were determined to be poor, the network was determined to not be congested, and there was no malfunctioning of a network element, then the user equipment may be determined to not be abnormal, and instead the RF coverage could be determined to be poor. Alternatively, if RF coverage is determined to be good or acceptable, and the network is not congested, but there is a malfunctioning network element in the user equipment record, then a network element may be determined to be malfunctioning. For example, an S1 interface associated with the network element may be malfunctioning, a scenario that can be checked. Also, if the network is congested, then the issue being experienced may result from a lack of resources.

In this example, a flow for identifying abnormal user equipment and determining a root cause of an abnormality can include counting RRC connections for each USER EQUIPMENT; determining if the count is beyond a threshold (in this example thirty over a period of time such as fifteen minutes); counting the number of UE-capability-enquiry-timeouts per user equipment in the determined time; and determining if the count exceeds a second threshold. If yes, the flow can continue with determining if CQI, RSRP, and RSRQ are acceptable. If not, the root cause can be determined to be poor RF coverage. If CQI, RSRP, and RSRQ are determined to be acceptable, the flow can continue to determining if any network element is malfunctioning (e.g., an S1 interface may have failed, or the like). If a network element is determined to be malfunctioning, the root cause can be determined to be the network element. If no such malfunctioning is determined, the flow can continue to determine if the network is congested. If the network is congested, the root cause of the failure can be identified as network congestion. If the network is determined to not be congested, the flow can continue to identify the user equipment as abnormal and to take actions (e.g., to notify operations, device teams, etc. about the abnormality). It should be understood that this example is illustrative, and therefore should not be construed as being limiting in any way. It should be noted that in the above example, network congestion can be computed from other events or from other sources of information.

From operation 406, the method 400 can proceed to operation 408. At operation 408, the computing device 102 can identify a solution 130 for the determined root cause of the failures. As noted above with reference to operation 406, the root cause determination can include determining if the failure likely results from a network RF coverage issue; a malfunctioning network element, network congestion, and/or abnormal UE, among other causes. The solution to the identified root cause can be based on the root cause identified. For example, if an RF coverage issue is detected, the solution can include, for example, adjusting antenna tilt and/or azimuth; adjusting antenna output power; adjusting frequency; recommending installation of a new tower; etc. Based on the above description, various embodiments of determining a root cause and/or identifying a solution can be determined. It should be understood that these examples are illustrative, and therefore should not be construed as being limiting in any way.

From operation 408, the method 400 can proceed to operation 410. At operation 410, the computing device 102 can output the solution 130. As noted above, the solution can be output as a command for implementation (e.g., a command to adjust an antenna tilt, a command to adjust an antenna azimuth, a command to adjust an output power associated with a base station and/or antenna, a command to change frequencies, combinations thereof, or the like), as a suggested line of inquiry for other devices or entities, or otherwise output or provided to other entities. According to various embodiments of the concepts and technologies disclosed herein, the solution can be provided to various entities such as, for example, network operations, device teams, or the like.

From operation 410, the method 400 can proceed to operation 412. The method 400 can end at operation 412.

Figure 6:
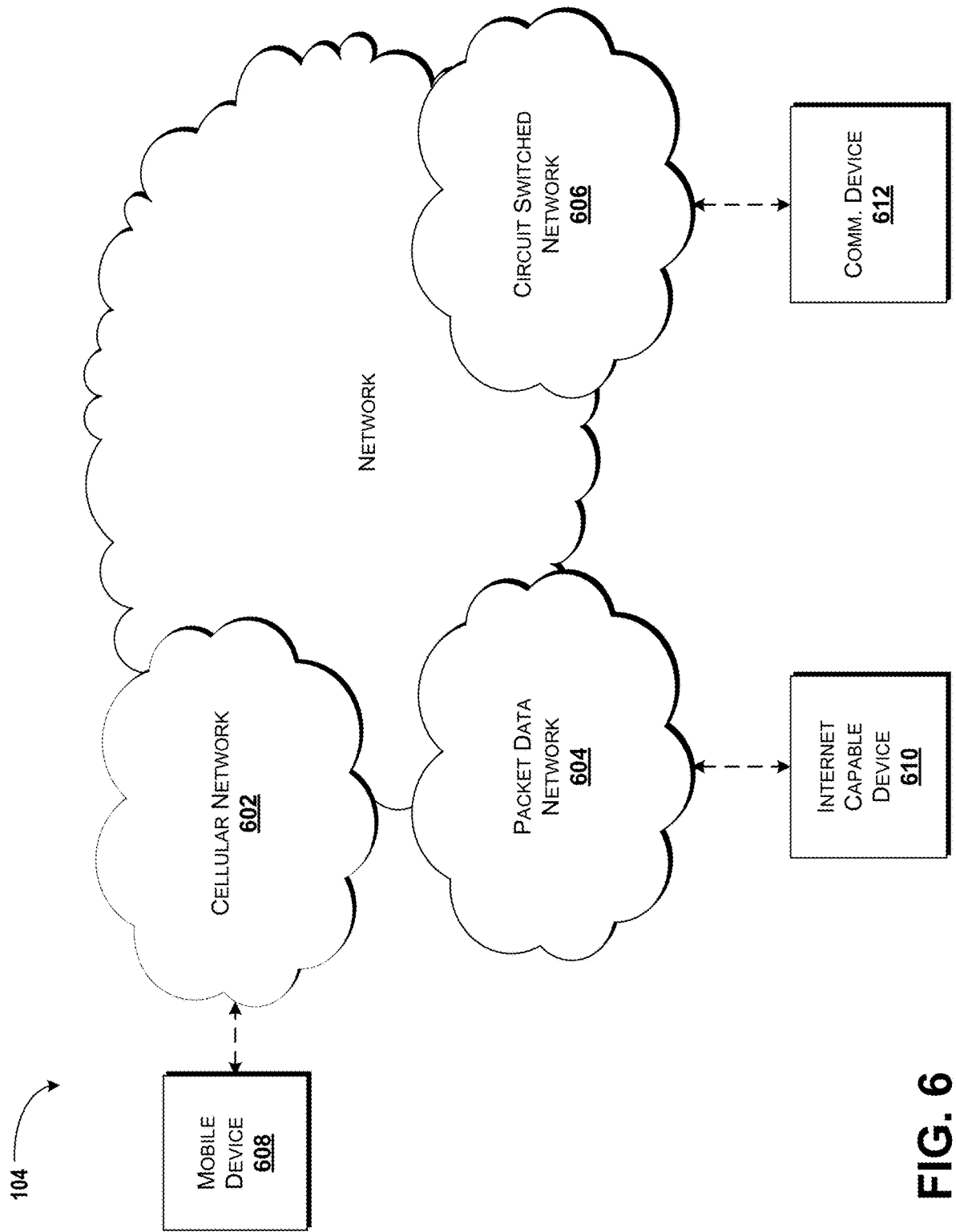
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
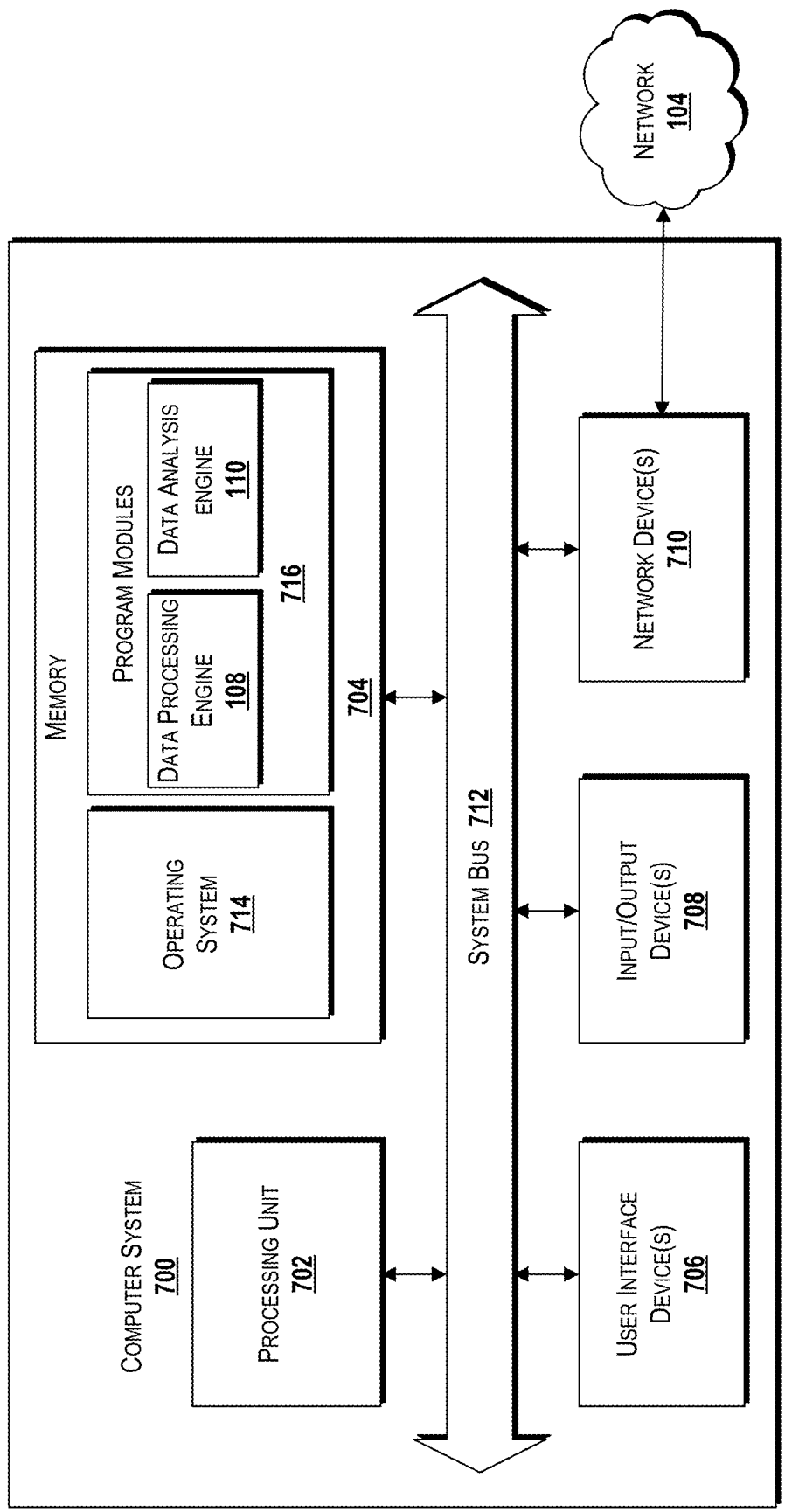
FIG. 7 is a block diagram illustrating an example computer system configured to use user equipment data clusters and spatial temporal graphs of abnormalities for root cause analysis, according to some illustrative embodiments of the concepts and technologies described herein.

FIG. 7 is a block diagram illustrating a computer system 700 configured to provide the functionality described herein for using user equipment data clusters and spatial temporal graphs of abnormalities for root cause analysis, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the data processing engine 108 and the data analysis engine 110. These and/or other programs can be embodied in computer-readable media containing instructions that, when executed by the processing unit 702, perform one or more of the methods 300 and 400 described in detail above with respect to FIGS. 3-4 and/or other functionality as illustrated and described herein. It can be appreciated that, at least by virtue of the instructions embodying the methods 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the user equipment data 112, the user equipment data clusters 122, the user equipment data thresholds, the spatial temporal graphs of abnormalities 124, the root cause analysis request 128, the solution 130, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as a BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
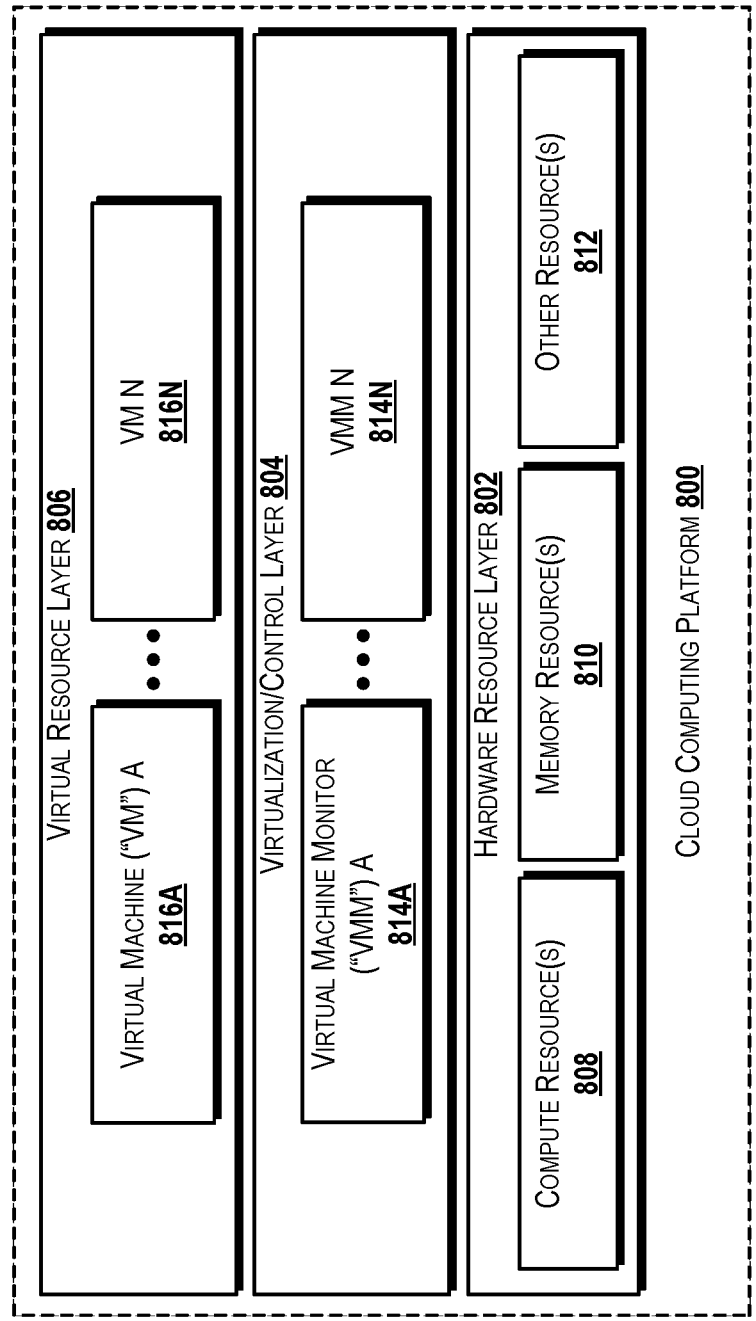
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for using user equipment data clusters and spatial temporal graphs of abnormalities for root cause analysis and/or for interacting with the computing device 102, the cellular network 116, and/or the user device 126. Thus, it can be appreciated that in some embodiments of the concepts and technologies disclosed herein, the cloud computing platform 800 illustrated in FIG. 8 can be used to provide the functionality described herein with respect to the computing device 102, the cellular network 116, and/or the user device 126.

The cloud computing platform 800 thus may be utilized to execute any aspects of the software components presented herein. Thus, according to various embodiments of the concepts and technologies disclosed herein, the data processing engine 108 and/or the data analysis engine 110 can be implemented, at least in part, on or by elements included in the cloud computing platform 800 illustrated and described herein. Those skilled in the art will appreciate that the illustrated embodiment of the cloud computing platform 800 is a simplification of but only one possible implementation of an illustrative cloud computing platform, and as such, the illustrated embodiment of the cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 806 can include one or more hardware components that can perform computations to process data, and/or to execute computer-executable instructions of one or more application programs, operating systems, services, and/or other software including, but not limited to, the data processing engine 108 and/or the data analysis engine 110 illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that the SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, Calif., and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the data processing engine 108, the data analysis engine 110, or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, user equipment data 112, the user equipment data clusters 122, the user equipment data thresholds, the spatial temporal graphs of abnormalities 124, the root cause analysis requests 128, the solution 130, and/or other data, if desired. It should be understood that this example is illustrative, and therefore should not be construed as being limiting in any way.

The other resource(s) 812 can include any other hardware resources that can be utilized by the compute resources(s)

808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Figure 9:
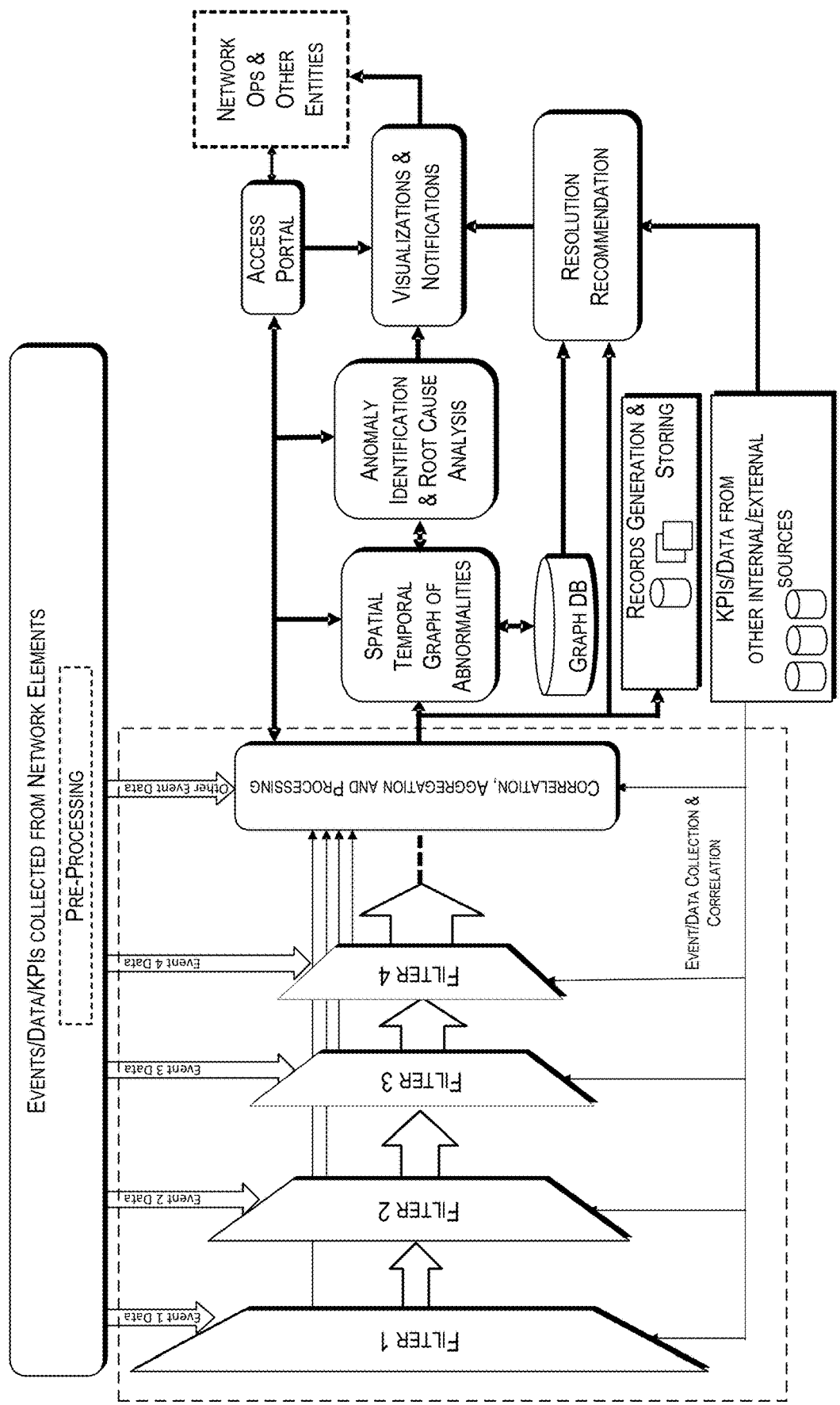
FIG. 9 is a diagram schematically illustrating an example hierarchy for constructing abnormality graphs and performing root cause analysis, according to one example embodiment of the concepts and technologies disclosed herein.

Turning now to FIG. 9, a diagram that schematically illustrates an example hierarchy for constructing spatial temporal graphs of abnormalities and performing root cause analysis is illustrated, according to one example embodiment of the concepts and technologies disclosed herein. It can be appreciated with reference to FIGS. 1-8 that FIG. 9 illustrates various aspects of the concepts and technologies disclosed herein. In particular, as shown in FIG. 9, the filters 118 (illustrated in FIG. 9 as Filter 1, Filter 2, Filter 3, and Filter 4) can obtain data relating to various events from various network elements, and/or other entities either before or after pre-processing as illustrated and described herein. According to one example embodiment, the first filter (Filter 1) can receive records and/or info relating to a first event and/or first type of event (e.g., RRC connection setup or other events) as illustrated and described herein. In the illustrated example embodiment, the second filter (Filter 2) can receive records and/or info relating to a second event and/or second type of event (e.g., S1-signal connection setup or other events) as illustrated and described herein.

In the illustrated example embodiment, the third filter (Filter 3) can receive records and/or info relating to a third event and/or third type of event (e.g., initial context setup or other events) as illustrated and described herein. In the illustrated example embodiment, the fourth filter (Filter 4) can receive records and/or info relating to a fourth event and/or fourth type of event (e.g., UE context release or other events) as illustrated and described herein. The data can be filtered as illustrated and described herein and passed to a correlation, aggregation, and/or processing module such as, for example, the data processing engine 108 and/or the data analysis engine 110. The data processing engine 108 and/or the data analysis engine 110 also can obtain records and/or info from other events such as, for example, traffic events, measurement events, handover events, and/or other events (e.g., via RRC measurement reports, UE traffic reports, Radio UE measurement reports, combinations thereof, or the like). The data processing engine 108 and/or the data analysis engine 110 also can be configured to obtain other data such as KPIs from other external and/or internal sources, as illustrated and described hereinabove. It should be understood that this example is illustrative, and therefore should not be construed as being limiting in any way.

As shown in FIG. 9, the aggregated and correlated data can be stored and/or used to generate a spatial temporal graph of abnormalities. The spatial temporal graph of abnormalities can be stored in a graph database (e.g., a Neo4j database, or the like) or used for anomaly identification and/or root cause analysis. The spatial temporal graph of abnormalities also can be used for resolution recommendation. Via an access portal, various visualizations based on the spatial temporal graph of abnormalities and/or resolution recommendations can be generated and/or notifications can be generated. The visualizations and/or the notifications can be provided to network operators and/or other entities, e.g., via an access portal or other functionality. It should be understood that this example is illustrative, and therefore should not be construed as being limiting in any way.

Based on the foregoing, it should be appreciated that systems and methods for using user equipment data clusters and spatial temporal graphs of abnormalities for root cause analysis have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
 a processor; and
 a memory that stores computer-executable instructions that, when executed by the processor, cause the processor to perform operations comprising
  obtaining user equipment data from a cellular network, the user equipment data comprising one or more values for one or more performance metrics for one or more instances of user equipment, wherein each of the one or more instances of user equipment is connected to the cellular network and is experiencing a failure, and wherein the one or more performance metrics relate to one or more connections between the one or more instances of user equipment and the cellular network,
  applying a filter having a threshold to the user equipment data to obtain a subset of records from the user equipment data, wherein the threshold specifies a value for the one or more performance metrics,
  determining if the threshold is to be adjusted based on a number of records included in the subset of records,
  in response to a determination that the threshold is to be adjusted, generating a plurality of data clusters by applying a clustering algorithm to a record set, determining a centroid for each of the plurality of data clusters, and adjusting the threshold based on the centroid for each of the plurality of data clusters, and in response to a determination that the threshold is not to be adjusted, adding the records of the subset of records to the record set, correlating the records of the subset of records based on a key to obtain a filtered and correlated version of the record set, generating, based on the filtered and correlated version of the record set, a spatial temporal graph of abnormalities associated with the cellular network, and determining, based on the spatial temporal graph of abnormalities, a root cause of the failure associated with the cellular network.

2. The system of claim 1, wherein the clustering algorithm comprises a k-means clustering algorithm, wherein generating the plurality of data clusters comprises generating two data clusters, and wherein determining the centroid for each of the plurality of data clusters comprises determining a first centroid for a first of the two data clusters and a second centroid for a second of the two data clusters.

3. The system of claim 2, wherein the first centroid is associated with a first value, wherein the second centroid is associated with a second value, and wherein adjusting the threshold comprises adjusting the threshold based on a function of the first value and the second value.

4. The system of claim 3, wherein the function of the first value and the second value comprises an average of the first value and the second value.

5. The system of claim 1, wherein the computer-executable instructions, when executed by the processor, cause the processor to perform operations further comprising:
identifying a solution for the root cause of the failure; and
outputting the solution for implementation on the cellular network.

6. The system of claim 1, wherein applying the filter comprises:
applying a first filter to the user equipment data to obtain a first subset of records;
applying a second filter to the record set to obtain a second subset of records; and
correlating and aggregating the first subset of records in the record set with the second subset of records.

7. The system of claim 1, wherein applying the filter comprises determining, based on values associated with data in included in the spatial temporal graph of abnormalities, whether the root cause relates to a malfunctioning user equipment, a malfunctioning network element, or poor coverage.

8. A method comprising:
obtaining, at a computing device comprising a processor, user equipment data from a cellular network, the user equipment data comprising one or more values for one or more performance metrics for one or more instances of user equipment, wherein each of the one or more instances of user equipment is connected to the cellular network and is experiencing a failure, and wherein the one or more performance metrics relate to one or more connections between the one or more instances of user equipment and the cellular network;
applying, by the processor, a filter having a threshold to the user equipment data to obtain a subset of records from the user equipment data, wherein the threshold specifies a value for the one or more performance metrics;

determining, by the processor, if the threshold is to be adjusted based on a number of records included in the subset of records;

in response to a determination that the threshold is to be adjusted, generating, by the processor, a plurality of data clusters by applying a clustering algorithm to a record set, determining a centroid for each of the plurality of data clusters, and adjusting the threshold based on the centroid for each of the plurality of data clusters; and in response to a determination that the threshold is not to be adjusted, adding, by the processor, the records of the subset of records to the record set, correlating, by the processor, the records of the subset of records based on a key to obtain a filtered and correlated version of the record set, generating, by the processor and based on the filtered and correlated version of the record set, a spatial temporal graph of abnormalities associated with the cellular network, and determining, by the processor and based on the spatial temporal graph of abnormalities, a root cause of the failure associated with the cellular network.

9. The method of claim 8, wherein the clustering algorithm comprises a k-means clustering algorithm, wherein generating the plurality of data clusters comprises generating two data clusters, and wherein determining the centroid for each of the plurality of data clusters comprises determining a first centroid for a first of the two data clusters and a second centroid for a second of the two data clusters.

10. The method of claim 9, wherein the first centroid is associated with a first value, wherein the second centroid is associated with a second value, and wherein adjusting the threshold comprises adjusting the threshold based on a function of the first value and the second value.

11. The method of claim 10, wherein the function of the first value and the second value comprises an average of the first value and the second value.

12. The method of claim 8, further comprising:
identifying a solution for the root cause of the failure; and
outputting the solution for implementation on the cellular network.

13. The method of claim 8, wherein applying the filter comprises:
applying a first filter to the user equipment data to obtain a first subset of records;
applying a second filter to the record set to obtain a second subset of records; and
correlating and aggregating the first subset of records in the record set with the second subset of records.

14. A computer storage medium having computer-executable instructions stored thereon that, when executed by a processor, cause the processor to perform operations comprising:
obtaining, at a computing device, user equipment data from a cellular network, the user equipment data comprising one or more values for one or more performance metrics for one or more instances of user equipment, wherein each of the one or more instances of user equipment is connected to the cellular network and is experiencing a failure, and wherein the one or more performance metrics relate to one or more connections between the one or more instances of user equipment and the cellular network;
applying a filter having a threshold to the user equipment data to obtain a subset of records from the user equipment data, wherein the threshold specifies a value for the one or more performance metrics;

determining if the threshold is to be adjusted based on a number of records included in the subset of records;

in response to a determination that the threshold is to be adjusted, generating a plurality of data clusters by applying a clustering algorithm to a record set, determining a centroid for each of the plurality of data clusters, and adjusting the threshold based on the centroid for each of the plurality of data clusters; and in response to a determination that the threshold is not to be adjusted, adding the records of the subset of records to the record set, correlating the records of the subset of records based on a key to obtain a filtered and correlated version of the record set, generating, based on the filtered and correlated version of the record set, a spatial temporal graph of abnormalities associated with the cellular network, and determining, based on the spatial temporal graph of abnormalities, a root cause of the failure associated with the cellular network.

15. The computer storage medium of claim 14, wherein the clustering algorithm comprises a k-means clustering algorithm, wherein generating the plurality of data clusters comprises generating two data clusters, and wherein determining the centroid for each of the plurality of data clusters comprises determining a first centroid for a first of the two data clusters and a second centroid for a second of the two data clusters.

16. The computer storage medium of claim 15, wherein the first centroid is associated with a first value, wherein the second centroid is associated with a second value, and wherein adjusting the threshold comprises adjusting the threshold based on a function of the first value and the second value.

17. The computer storage medium of claim 16, wherein the function of the first value and the second value comprises an average of the first value and the second value.

18. The computer storage medium of claim 14, wherein the computer-executable instructions, when executed by the processor, cause the processor to perform operations further comprising:

identifying a solution for the root cause of the failure; and outputting the solution for implementation on the cellular network.

19. The computer storage medium of claim 14, wherein applying the filter comprises:

applying a first filter to the user equipment data to obtain a first subset of records;

applying a second filter to the record set to obtain a second subset of records; and correlating and aggregating the first subset of records in the record set with the second subset of records.

20. The computer storage medium of claim 14, wherein applying the filter comprises determining, based on values associated with data in included in the spatial temporal graph of abnormalities, whether the root cause relates to a malfunctioning user equipment, a malfunctioning network element, or poor coverage.

* * * * *